(12) United States Patent
Jacksy

(10) Patent No.: US 10,409,277 B2
(45) Date of Patent: Sep. 10, 2019

(54) REMOTELY CONTROLLED RESCUE SYSTEMS AND ASSOCIATED METHODS AND KITS

(71) Applicant: Robert Jacksy, Maumee, OH (US)

(72) Inventor: Robert Jacksy, Maumee, OH (US)

( * ) Notice: Subject to any disclaimer, the term of this patent is extended or adjusted under 35 U.S.C. 154(b) by 123 days.

(21) Appl. No.: 15/798,454

(22) Filed: Oct. 31, 2017

(65) Prior Publication Data

US 2018/0120831 A1    May 3, 2018

Related U.S. Application Data

(60) Provisional application No. 62/415,625, filed on Nov. 1, 2016.

(51) Int. Cl.
| | | |
|---|---|---|
| G05D 1/00 | (2006.01) | |
| G05D 1/02 | (2006.01) | |
| B62D 39/00 | (2006.01) | |

(52) U.S. Cl.
CPC ........... G05D 1/0016 (2013.01); B62D 39/00 (2013.01); G05D 1/021 (2013.01); G05D 1/0206 (2013.01); B60Y 2200/80 (2013.01)

(58) Field of Classification Search
CPC .... G05D 1/0016; G05D 1/0206; G05D 1/021; B62D 39/00
See application file for complete search history.

(56) References Cited

U.S. PATENT DOCUMENTS

| | | |
|---|---|---|
| 3,086,465 A | 4/1963 | Montfort |
| 3,711,879 A | 1/1973 | Siefert |
| 3,762,478 A | 10/1973 | Cummins |
| 4,545,315 A | 10/1985 | Becherer |
| 4,621,562 A | 11/1986 | Carr et al. |
| 4,902,260 A | 2/1990 | Im |
| 4,932,831 A | 6/1990 | White et al. |
| 4,993,912 A | 2/1991 | King et al. |
| 5,022,812 A | 6/1991 | Coughlan et al. |
| 5,350,033 A | 9/1994 | Kraft |
| 5,427,557 A * | 6/1995 | Lunden, Sr. .............. B63C 9/32 180/319 |
| 5,857,534 A | 1/1999 | DeVault et al. |
| 6,398,606 B1 | 6/2002 | Borrelli |
| 6,431,296 B1 | 8/2002 | Won |
| 6,558,218 B1 | 5/2003 | Hansen |
| 6,633,800 B1 | 10/2003 | Ward et al. |
| 6,802,237 B1 | 10/2004 | Jones et al. |
| 7,007,626 B2 | 3/2006 | Hobson et al. |

(Continued)

*Primary Examiner* — Yazan A Soofi

(74) *Attorney, Agent, or Firm* — Buchanan Van Tuinen LLC

(57) ABSTRACT

Remotely controlled rescue systems and associated methods and kits are described. An example embodiment of a remotely controlled rescue system includes a vehicle, a storage container attached to the vehicle, a cord disposed within the storage container, a personal floatation device attached to the vehicle, and a controller. The vehicle includes a first motor, a support frame, a main body formed of a material that is buoyant in water, a second motor, and a bottom plate formed of a material that is buoyant in water. The first motor is attached to the support frame and produces ground propulsion. The second motor produces marine propulsion and is attached to the bottom plate. The cord has a first end attached to a portion of the remotely controlled rescue system.

20 Claims, 19 Drawing Sheets

(56) References Cited

U.S. PATENT DOCUMENTS

| | | |
|---|---|---|
| 7,011,171 B1 | 3/2006 | Poulter |
| 7,264,062 B1 | 9/2007 | Ham |
| 7,380,627 B2 | 6/2008 | Huang et al. |
| 7,478,817 B1 | 1/2009 | Carrier |
| 7,581,605 B2 | 9/2009 | Caspi et al. |
| 7,654,348 B2 | 2/2010 | Ohm et al. |
| 7,743,858 B2 | 6/2010 | Novoplanski et al. |
| 7,784,570 B2 | 8/2010 | Couture et al. |
| 7,896,113 B1 | 3/2011 | Ramirez |
| 7,962,243 B2 | 6/2011 | Deguire et al. |
| 8,083,569 B2 | 12/2011 | Sotereanos et al. |
| 8,122,982 B2 | 2/2012 | Morey et al. |
| 8,256,542 B2 | 9/2012 | Couture et al. |
| 8,272,467 B1 | 9/2012 | Staab |
| 8,353,373 B2 | 1/2013 | Rudakevych |
| 8,360,178 B2 | 1/2013 | Goldenberg et al. |
| 8,464,816 B2 | 6/2013 | Carrier |
| 8,636,096 B2 | 1/2014 | Kim et al. |
| 8,636,554 B1 * | 1/2014 | Connolly ............. B60F 3/0061 441/80 |
| 8,651,206 B2 | 2/2014 | Slawinski et al. |
| 8,800,695 B2 | 8/2014 | Couture et al. |
| 8,812,156 B2 | 8/2014 | Lee et al. |
| 2006/0178085 A1 | 8/2006 | Sotereanos et al. |
| 2009/0095096 A1 | 4/2009 | Dean et al. |
| 2012/0097461 A1 | 4/2012 | Rudakevych |
| 2012/0276794 A1 * | 11/2012 | Mulligan ............... B63B 35/00 441/80 |
| 2013/0112440 A1 | 5/2013 | Alsaif et al. |
| 2014/0110183 A1 | 4/2014 | Rudakevych et al. |
| 2015/0307172 A1 | 10/2015 | Ng |
| 2016/0340006 A1 * | 11/2016 | Tang ....................... B63C 9/01 |
| 2018/0016022 A1 * | 1/2018 | Ljung ................. B64C 39/024 |
| 2019/0106190 A1 * | 4/2019 | Schibli .................... B63J 99/00 |

* cited by examiner

REMOTELY CONTROLLED RESCUE SYSTEMS AND ASSOCIATED METHODS AND KITS

FIELD

The disclosure relates generally to the field of rescue systems. More particularly, the disclosure relates to remotely controlled rescue systems and associated methods and kits.

BACKGROUND

When an individual traverses, plays, skates, or otherwise becomes disposed upon a frozen body of water, such as a lake, the individual is subject to the integrity of the ice, which can fail and result in the individual falling through the ice. In these situations, the individual may require assistance to move to a safe location and avoid suffering serious injury, such as hypothermia or death. Rescue attempts, however, present complex situations to a would be rescuer due to weather conditions, the position of the individual relative to the rescuer, the integrity of the ice, and the experience and/or equipment available to the rescuer.

In some cases, when a rescuer lacks the experience or equipment to adequately provide assistance to the individual, the rescuer can fall through the ice and require rescuing. Professional rescuers, such as rescue squad members and firemen, are more successful in rescuing individuals that fall through ice due to the specific training they receive and the equipment they possess. However, even professional rescuers typically have to traverse the ice with ropes, hook poles, ladders or the like, and run the risk of falling through the ice and requiring rescuing.

Therefore, a need exists for new and useful approaches to rescuing a person.

SUMMARY OF SELECTED EXAMPLE EMBODIMENTS

Various remotely controlled rescue systems, methods of rescuing a person, and kits that include a remotely controlled rescue system are described herein.

An example remotely controlled rescue system includes a vehicle, a storage container attached to the vehicle, a cord disposed within the storage container, a personal floatation device attached to the vehicle, and a controller. The vehicle includes a first motor, a support frame, and a main body formed of a material that is buoyant in water. The first motor is attached to the support frame and produces ground propulsion. The cord has a first end attached to a portion of the remotely controlled rescue system. The controller is in communication with the vehicle and remotely controls movement of the vehicle.

Another example remotely controlled rescue system includes a vehicle, a storage container attached to the vehicle, a cord disposed within the storage container, a personal floatation device attached to the vehicle, and a controller. The vehicle includes a first motor, a support frame, a main body formed of a material that is buoyant in water, a second motor, and a bottom plate formed of a material that is buoyant in water. The first motor is attached to the support frame and produces ground propulsion. The second motor produces marine propulsion and is attached to the bottom plate. The cord has a first end attached to a portion of the remotely controlled rescue system. The controller is in communication with the vehicle and remotely controls movement of the vehicle.

Another example remotely controlled rescue system includes a vehicle, a storage container attached to the vehicle, a cord disposed within the storage container, a personal floatation device attached to the vehicle, and a controller. The vehicle includes a first motor, a support frame, a main body formed of a material that is buoyant in water, a second motor, a bottom plate formed of a material that is buoyant in water, a crash plate, and a handle. The first motor is attached to the support frame and produces ground propulsion. The second motor produces marine propulsion and is attached to the bottom plate. The cord has a first end attached to a portion of the remotely controlled rescue system. The controller is in communication with the vehicle and remotely controls movement of the vehicle. The crash plate is attached to the main body and has a first curved portion and a second linear portion. The handle is attached to the crash plate and the main body and extends over a portion of the main body.

An example method of rescuing a person disposed at a rescue location comprises the steps of: obtaining a remotely controlled rescue system having a vehicle, a storage container attached to the vehicle, a cord disposed within the storage container, and a controller for remotely controlling movement of the vehicle, the vehicle has a first motor that produces a first form of propulsion and a second motor that produces a second form of propulsion that is different from the first form of propulsion, the cord has a first end and a second end; another step comprises positioning the vehicle of the remotely controlled rescue system at a first location; another step comprises attaching the first end of the cord to a portion of the remotely controlled rescue system; another step comprises attaching the second end of the cord to an object disposed at a second location that is different from the first location; another step comprises remotely navigating the vehicle toward the person at the rescue location; another step comprises communicating with the person and requesting that the person grasp a portion of the remotely controlled rescue system; another step comprises remotely navigating the vehicle away from the person; another step comprises applying an axial force on the cord and away from the person; and another step comprises removing the person from the rescue location.

Another example method of rescuing a person disposed at a rescue location comprises the steps of: obtaining a remotely controlled rescue system having a vehicle, a storage container attached to the vehicle, a cord disposed within the storage container, and a controller for remotely controlling movement of the vehicle, the vehicle has a support frame, a bottom plate attached to the support frame, a first motor attached to the support frame that produces ground propulsion, and a second motor attached to the bottom plate that produces marine propulsion, the cord has a first end and a second end, the bottom plate is formed of a material that is buoyant in water and defines a recess, the second motor is disposed within the recess defined by the bottom plate; another step comprises positioning the vehicle of the remotely controlled rescue system at a first location; another step comprises attaching the first end of the cord to a portion of the remotely controlled rescue system; another step comprises attaching the second end of the cord to an object disposed at a second location that is different from the first location; another step comprises remotely navigating the vehicle toward the person at the rescue location; another step comprises communicating with the person and requesting that the person grasp a portion of the remotely controlled rescue system; another step comprises navigating the vehicle around the person to form a loop around the person; another step comprises remotely navigating the vehicle away from the person; another step comprises applying an axial force on the cord and away from the person; and another step comprises removing the person from the rescue location.

Another example method of rescuing a person disposed at a rescue location comprises the steps of: obtaining a remotely controlled rescue system having a vehicle, a storage container attached to the vehicle, a cord disposed within the storage container, a personal floatation device attached to the vehicle, and a controller for remotely controlling movement of the vehicle, the vehicle has a support frame, a main body attached to the support frame, a bottom plate attached to the support frame, a first motor attached to the support frame that produces ground propulsion, and a second motor attached to the bottom plate that produces marine propulsion, the support frame has a first deck, a second deck, and a spacer disposed between the first deck and the second deck, the spacer attached to each of the first deck and the second deck, each of the storage container and the personal floatation device is attached to the main body, the cord has a first end and a second end, each of the main body and the bottom plate formed of a material that is buoyant in water, the bottom plate defines a recess, the second motor disposed within the recess defined by the bottom plate; another step comprises positioning the vehicle of the remotely controlled rescue system at a first location; another step comprises attaching the first end of the cord to a portion of the remotely controlled rescue system; another step comprises attaching the second end of the cord to an object disposed at a second location that is different from the first location; another step comprises remotely navigating the vehicle toward the person at the rescue location; another step comprises activating the personal floatation device; another step comprises communicating with the person and requesting that the person grasp a portion of the remotely controlled rescue system; another step comprises communicating with the person and requesting that the person grasp the personal floatation device; another step comprises navigating the vehicle around the person to form a loop around the person; another step comprises remotely navigating the vehicle away from the person; another step comprises applying an axial force on the cord and away from the person; and another step comprises removing the person from the rescue location.

An example kit that includes a remotely controlled rescue system comprises a first remotely controlled rescue system according to an embodiment; a bottom plate according to an embodiment; a second motor according to an embodiment; a nozzle according to an embodiment; a marine servo according to an embodiment; a grate according to an embodiment; tires according to an embodiment; snow chains according to an embodiment; and instructions for use.

Additional understanding of the example remotely controlled rescue systems, methods of rescuing a person, and kits that include a remotely controlled rescue system can be obtained by review of the detailed description, below, and the appended drawings.

DETAILED DESCRIPTION

Figure 1:
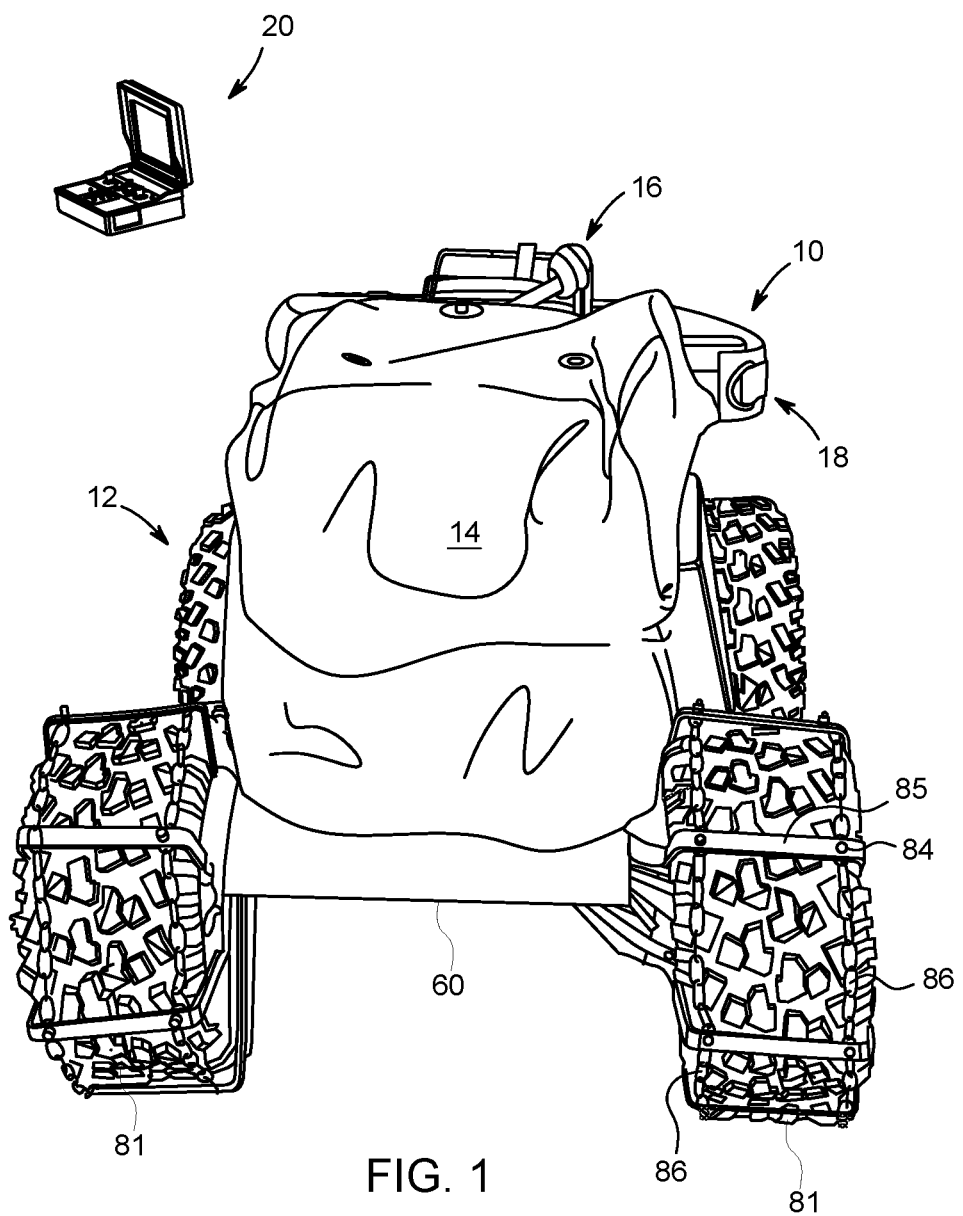
FIG. 1 is a perspective view of a first example remotely controlled rescue system.

The following detailed description and the appended drawings describe and illustrate various example embodiments of remotely controlled rescue systems, methods of rescuing a person using a remotely controlled rescue system, and kits that include a remotely controlled rescue system. The description and illustration of these examples are provided to enable one skilled in the art to make and use a remotely controlled rescue system, to practice a method of rescuing a person using a remotely controlled rescue system, and to make a kit that includes a remotely controlled rescue system. They are not intended to limit the scope of the claims in any manner.

FIGS. 1, 2, 3, 4, 5, 6, 7, 8, 9, 10, and 11 illustrate a first example remotely controlled rescue system 10. The remotely controlled rescue system 10 includes a vehicle 12, a storage container 14, a cord 16, a personal floatation device 18, and a controller 20.

A vehicle included in a remotely controlled rescue system can have any suitable structural arrangement, include any suitable number and type of components, devices, systems, and/or features, and can include any suitable number of motors that produce any suitable form of propulsion. An example vehicle considered suitable to include in a remotely controlled rescue system is vehicle 12 shown in FIGS. 1, 2, 3, 4, 5, 6, 7, 8, 9, and 10. The vehicle 12 includes a first motor 26 that produces a first form of propulsion, which, in the embodiment illustrated, is ground propulsion. In addition, the vehicle 12 includes a support frame 28, a transmission 30, a transfer case 32, a first drive shaft 34, a second drive shaft 36, a front differential 38, a rear differential 40, a plurality of wheel axles 42, a plurality of wheels 44, a front suspension system 46, a rear suspension system 48, a first receiver 50, a second receiver 52, a plurality of steering servos 54, an energy storage device 56, an electronic speed control circuit (ESC) 58, and a main body 60.

In the illustrated embodiment, the first motor 26 is attached to the support frame 28 using bolts and comprises a 2200 Kv brushless electric motor that is operatively connected to the transmission 30 and the first receiver 50. While the first motor 26 has been illustrated as an electric motor attached to the support frame 28 using bolts, a first motor can be attached to a support frame using any suitable technique or method of attachment and include any suitable motor capable of producing ground propulsion. Selection of a suitable motor can be based on various considerations, including the intended use of the remotely controlled rescue system. Examples of motors considered suitable to include in a remotely controlled rescue system include brushed motors, brushless motors, combustion engines, such as commercially-available combustion engines typically used in hobby applications and powered by a fuel mixture comprising one or more of methanol, nitromethane, and/or oil, electric motors, and any other motor considered suitable for a particular embodiment. Examples of techniques and methods of attachment considered suitable between a motor and a support frame include using attachment members, such as screws, nuts, and/or bolts, welding and/or fusing components to one another, using an adhesive, and/or any other technique or method of attachment considered suitable for a particular embodiment.

Figure 2:
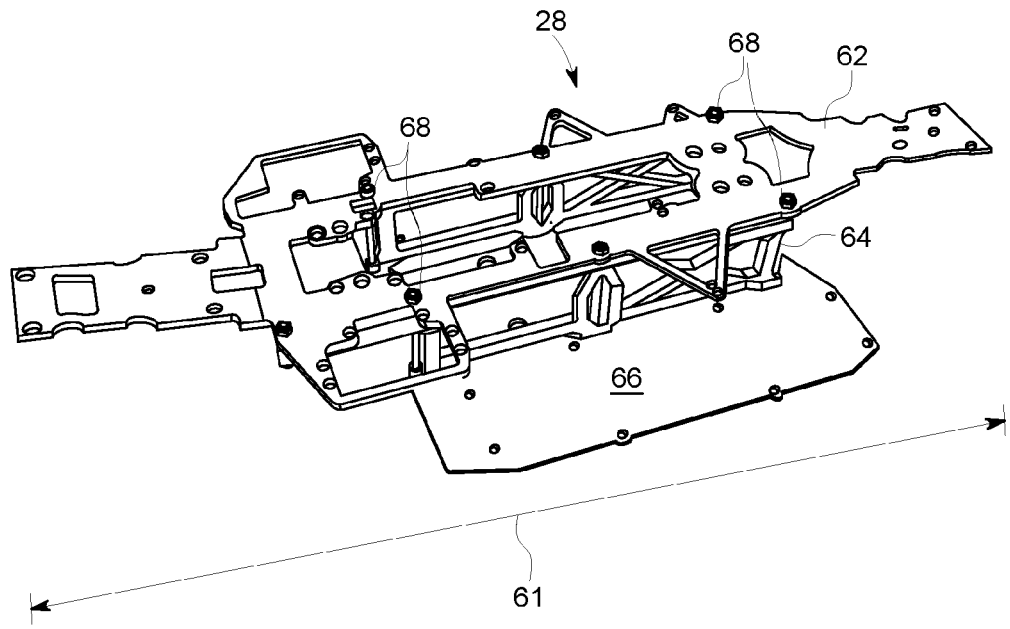
FIG. 2 is a perspective view of the support frame of the vehicle of the remotely controlled rescue system illustrated in FIG. 1.
Figure 3:
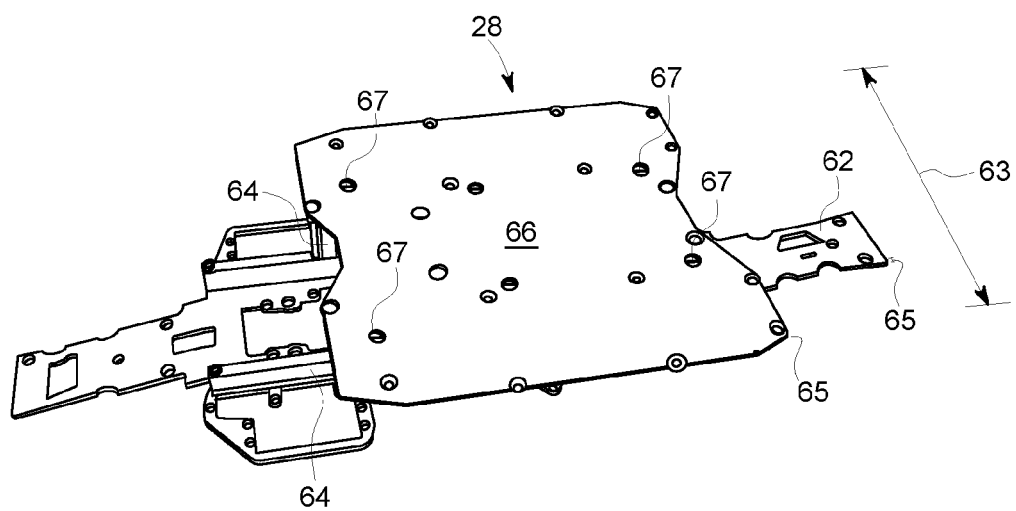
FIG. 3 is another perspective view of the support frame illustrated in FIG. 2.

As shown in FIGS. 2 and 3, support frame 28 (e.g., chassis) has a length 61, a first deck 62, a width 63, a plurality of spacers 64, and a second deck 66. Each spacer of the plurality of spacers 64 is disposed between the first deck 62 and the second deck 66 and is attached to each of the first deck 62 and the second deck 66 using attachment members 67 and nuts 68. Each of the first deck 62 and the second deck 66 has a thickness 65 that extends from a top surface to a bottom surface. In the illustrated embodiment, the length 61 of the support deck 28 is equal to about 42 centimeters, the width 63 of the support deck 28 is equal to about 18 centimeters, and the thickness 65 of each deck 66, 66 is equal to about 2 millimeters. Each deck 62, 66 is formed of a first material and each spacer of the plurality spacers 64 is formed of a second material that is different from the first material. In the illustrated embodiment, the first material is aluminum and the second material is a thermoplastic (e.g., Delrin). In the illustrated embodiment, the energy storage device 56 is attached to the first deck 62 and each of the first motor 26, transmission 30, transfer case 32, the front differential 38, the rear differential 40, the front suspension system 46, the rear suspension system 48, and each servo of the plurality of steering servos 54 is attached to the second deck 66.

While the support frame 28 has been illustrated as having a particular structural arrangement, dimensions, and as having components attached at particular locations, a support frame can have any suitable structural arrangement, dimensions, and number of components attached at any suitable location using any suitable technique or method of attachment. Selection of a suitable structural arrangement for a support frame and location to attached particular components of a vehicle can be based on various considerations, including the intended use of a remotely controlled rescue system in which the support frame is a component. For example, alternative to forming the support frame of a first deck, a plurality of spacers, and a second deck, a support frame can alternatively be formed as a single, integral, unit formed of a single material and having the same structural arrangement as the support frame 28 illustrated in FIGS. 2 and 3, or a structural arrangement that is different from that shown with respect to support frame 28 illustrated in FIGS. 2 and 3. Examples of materials considered suitable to form a support frame include metals, such as aluminum, alloys, polymers, plastics, thermoplastics, materials that are buoyant in water, fiberglass, materials that are buoyant in water that are covered in layers of fiberglass, and any other material considered suitable for a particular embodiment. Examples of techniques and methods of attachment considered suitable to attach one or more components to a support frame include using attachment members, such as screws, nuts, and/or bolts, welding and/or fusing components to one another, using an adhesive, and/or any other technique or method of attachment considered suitable for a particular embodiment.

Figure 4:
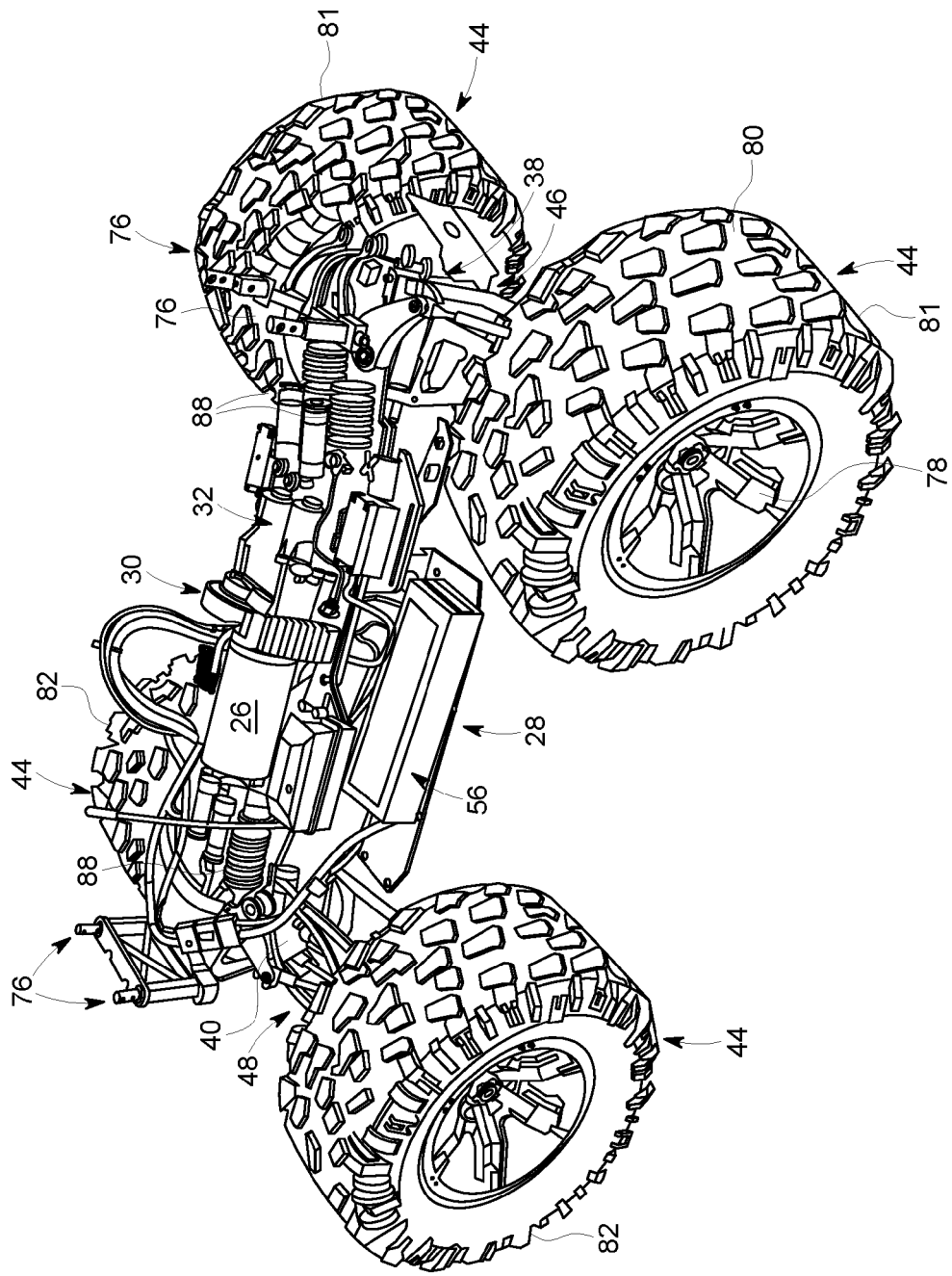
FIG. 4 is a perspective view of a portion of the vehicle of the remotely controlled rescue system illustrated in FIG. 1. The main body has been removed from the vehicle.
Figure 5:
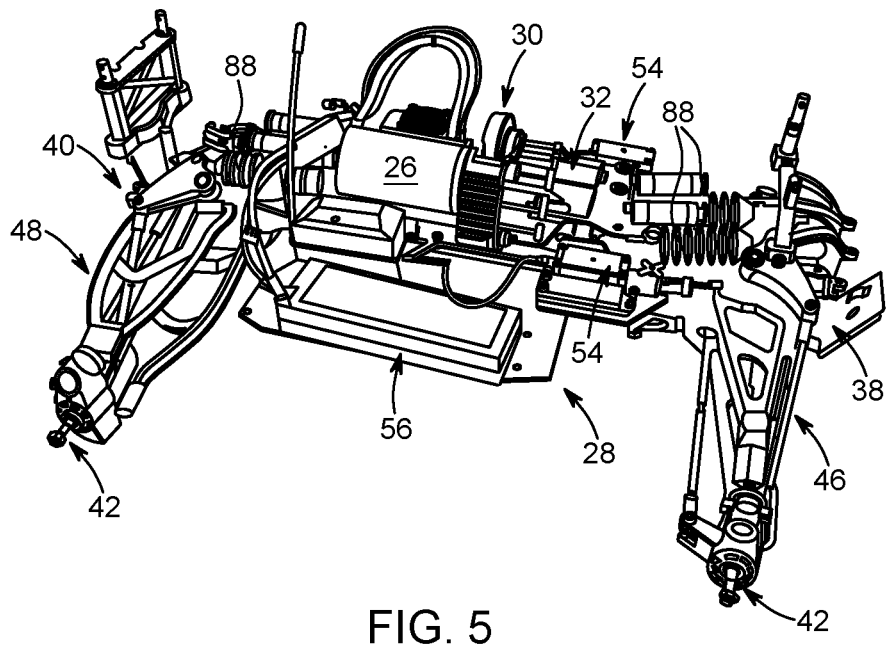
FIG. 5 is a perspective view of another portion of the vehicle of the remotely controlled rescue system illustrated in FIG. 1. The main body and the wheels have been removed from the vehicle.
Figure 6:
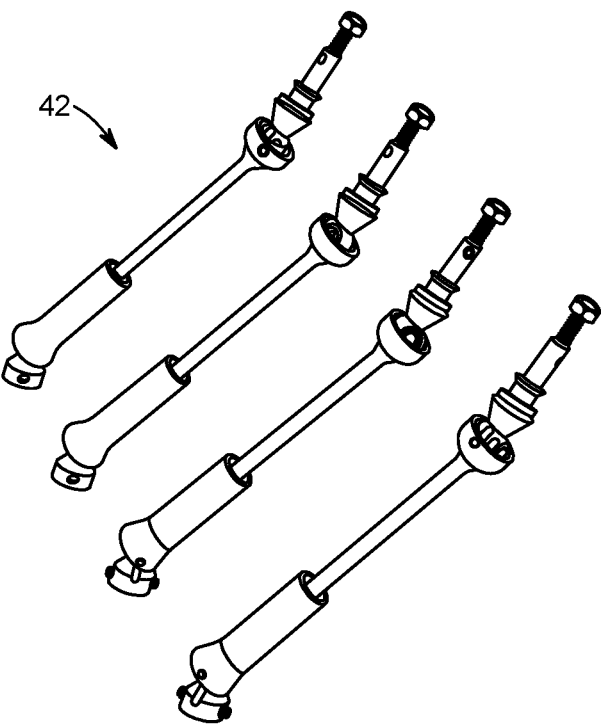
FIG. 6 is a perspective view of the plurality of axles of the vehicle of the remotely controlled rescue system illustrated in FIG. 1.
Figure 7:
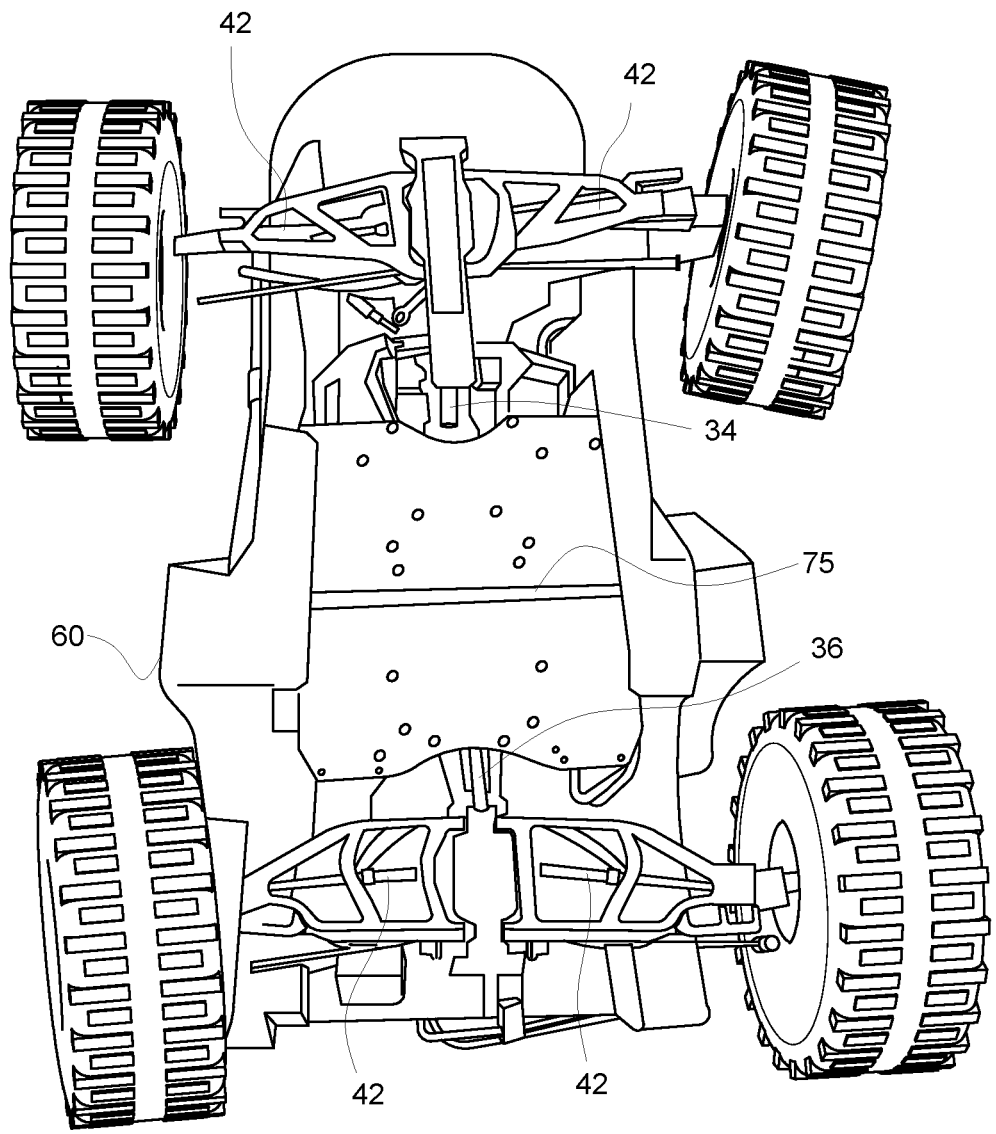
FIG. 7 is a perspective view of the vehicle of the remotely controlled rescue system illustrated in FIG. 1.

As shown in FIGS. 4 and 5, each of the transmission 30, transfer case 32, the front differential 38, the rear differential 40, the front suspension system 46, and the rear suspension system 48 is attached to the support frame 28. In the illustrated embodiment, the transmission 30 is attached to the support frame 28 using six screws and has a single spring slipper clutch attached to a sixty-eight toothed spur gear that is turned by a fourteen-toothed pinion gear. The transmission 30 is operatively connected to the first motor 26 and distributes mechanical energy to the transfer case 32. Mechanical energy from the transmission 30 is transferred from the first motor 26 to the transfer case 32, which then transfers the mechanical energy to the front differential 38 and the rear differential 40 via the drive shafts 34, 36 such that the vehicle 12 can accomplish four-wheel drive capabilities. In the illustrated embodiment, the transmission 30 is attached to the first motor 26 using two screws. However, other techniques and methods of attachment can be used to attach a motor to a transmission, such as welding the two components to one another.

While a particular transmission 30 has been illustrated as being attached to the support frame 28, a vehicle can include any suitable transmission that can be attached to a support frame using any suitable technique or method of attachment and selection of a suitable transmission and technique and/or method to attach the transmission to a support frame can be based on various considerations, including the material(s) that form the transmission. Examples of transmissions considered suitable to include on a vehicle include non-locking transmissions, non-locking limited slop differential transmissions, and any other transmission considered suitable for a particular embodiment. Examples of techniques and methods of attachment considered suitable between a transmission and a support frame include using attachment members, such as screws, nuts, and/or bolts, welding and/or fusing components to one another, using an adhesive, and/or any other technique or method of attachment considered suitable for a particular embodiment.

The transfer case 32 is operatively connected to the transmission 30 and to each of the first drive shaft 34 and the second drive shaft 36 and distributes mechanical energy to each of the first drive shaft 34 and the second drive shaft 36. The first drive shaft 34 is operatively connected to the front differential 38 and distributes mechanical energy from the transfer case 32 to the front differential 38. The second drive shaft 36 is operatively connected to the rear differential 40 and distributes mechanical energy from the transfer case 32 to the rear differential 40. Each wheel axle of the plurality of wheel axles 42 has a first end that is operatively connected to a differential (e.g., front differential 38, rear differential 40) and a second end that is operatively connected to a wheel of the plurality of wheels 44 such that each wheel axle of the plurality of wheel axles 42 transfers mechanical energy from a differential (e.g., front differential 38, rear differential 40) to a wheel of the plurality of wheels 44. Each wheel of the plurality of wheels 44 is operatively connected to a wheel axle of the plurality of wheel axles 42 and to a suspension system (e.g., front suspension system 46, rear suspension system 48).

In the illustrated embodiment, each of the first drive shaft 34, the second drive shaft 36, and each axle of the plurality of wheel axles 42 is formed of hardened steel. The inventor has determined that forming a drive shaft and each axle of hardened steel is advantageous at least because this material does not become brittle in low temperatures relative to other materials, such as shafts and axles formed of plastic composites. While the drive shafts 34, 36 and each axle of the plurality of wheel axles 42 have been described as being formed of a particular material, a drive shaft and an axle included on a vehicle of a remotely controlled rescue system can be formed of any suitable material. Selection of a suitable material to form a drive shaft and/or axle can be based on various considerations, including the intended use of a remotely controlled rescue system of which the vehicle is a component. Examples of materials considered suitable to form a drive shaft and/or wheel axle included on a vehicle of a remotely controlled rescue system include metals, hardened steel, alloys, aluminum alloys, polymers, thermoplastics, and any other material considered suitable for a particular embodiment.

In the illustrated embodiment, each wheel axle of the plurality of wheel axles 42 has a differential output shaft bore that is equal to about 6 millimeters and is formed of two-pieces that are splined to allow long suspension travel. Each axle of the plurality of axles 42 has an end that has an exterior surface that is threaded and sized and configured to receive a hub 78, as described in more detail herein, after passing through a plastic alloy steering knuckle. Each wheel of the plurality of wheels 44 is operatively connected to a suspension system (e.g., front suspension system 46, rear suspension system 48) and to an axle of the plurality of wheel axles 42. As shown in FIG. 4, each wheel of the plurality of wheels 44 has a hub 78 and a tire 80. Each hub 78 is about 6.5 centimeters in width, about 9.5 centimeters in height, and is formed of a glass-filled composite, which the inventor considers advantageous at least because this material has increased strength and reduced weight relative to other materials. Each tire 80 is treaded for snow, is foam-filled, about 20 centimeters in height, and about 8 centimeters in width. As shown in FIG. 1, the front wheels 81 of the plurality of wheels 44 are wrapped with snow chains that include stainless steel spikes 84 that are each about 1 centimeter long and attached to elongated pieces of steel 85 that are about 1 centimeter wide and attached to the tire with two chains 86. The inventor has determined that omitting the spikes, elongated pieces of steel, and chains from the rear wheels 82 is advantageous at least because these components are not generally needed to advance a vehicle out of a first material (e.g., water) and onto a second material (e.g., ice), and because the inclusion of such components may result in injury to any person being rescued due to the position of the components relative to the cord 16, which may prevent the individual from reaching life-saving gear, as described herein.

While each wheel of the plurality of wheels 44 has been described as having a particular structural arrangement and the front wheels 81 have been illustrated as including snow chains, a wheel included on a vehicle of a remotely controlled rescue system can have any suitable structural arrangement and can include any suitable structure. Selection of a suitable wheel to include on a vehicle of a remotely controlled rescue system can be based on various considerations, including the intended use of the wheel. For example, the spikes, elongated pieces of steel, and chains can be omitted from a vehicle included in a remotely controlled rescue system or included on all four tires.

Each of the front suspension system 46 and the rear suspension system 48 is attached to the second deck 66 of the support frame 28, is operatively connected to a set of wheels of the plurality of wheels 44, and can include any suitable component, device, and/or system such as the heavy-duty shock absorbers 88 illustrated in FIGS. 4 and 5. Each of the shock absorbers 88 absorbs energy placed on the wheels during use and/or transfers the weight of the vehicle 12 during use. In the illustrated embodiment, each shock absorber 88 is inboard mounted, which the inventor considers advantageous at least because this configuration reduces the likelihood that a shock absorber will become entangled in debris from land or water use and reduces the upspring weight allowing the suspension systems 46, 48 to react faster to rough surfaces relative to shock absorbers that are mounted in other configurations.

Figure 9:
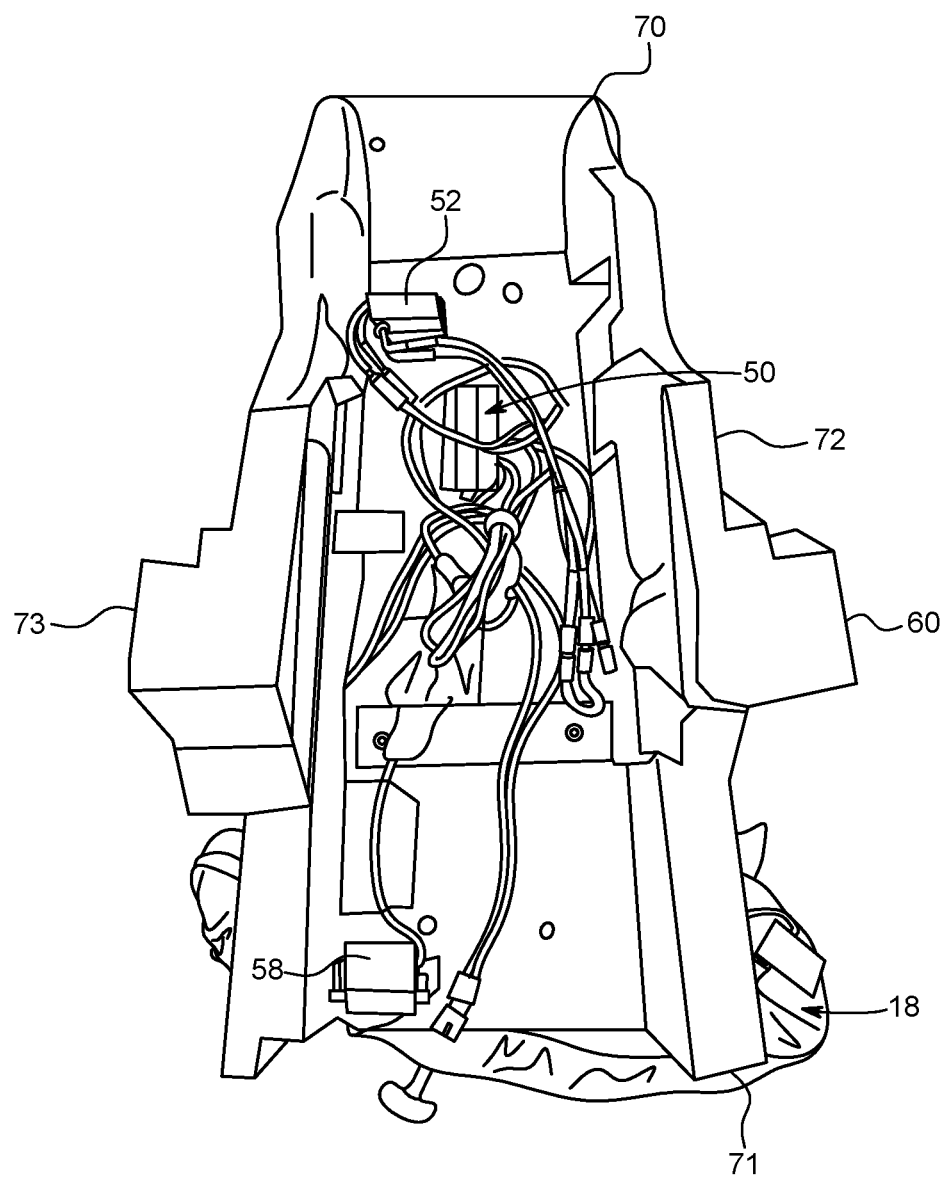
FIG. 9 is another perspective view of the portion of the vehicle, the storage container, the cord, and the personal floatation device illustrated in FIG. 8.

As shown in FIG. 9, each of the first receiver 50, the second receiver 52, and the ESC 58 is disposed in a separate waterproof composite clamshell box that is attached to the underside of the main body 60 using three screws and lock nuts. It is considered advantageous to position each receiver 50, 52 and the ESC 58 on the underside of the main body 60 to avoid contact with water during use. Each of the first receiver 50 and the second receiver 52 receives command signals transmitted on one or more radio channels by the controller 20. Generally, the number of radio channels utilized by the first receiver 50 and/or second receiver 52 corresponds to the number of vehicle features intended to be controlled. In the illustrated embodiment, the first receiver 50 is a four-channel receiver and the second receiver 52 is an eight-channel receiver. The first receiver 50 is operatively connected to the ESC 58 and is operatively connected to and controls the first motor 26 and each servo of the plurality of steering servos 54. The second receiver 52 is operatively connected to the energy storage device 56 and is operatively connected to and controls the personal floatation device 18.

While two receivers 50, 52 and a single ESC 58 have been illustrated, a vehicle can include any suitable type and number of receivers and ESCs and selection of a suitable type and number of receivers and ESCs to include on a vehicle of a remotely controlled vehicle can be based on various considerations, including the number and type of features intended to be controlled. Examples of types of receivers considered suitable to include on a vehicle of a remotely controlled rescue system include receivers that have four channels, receivers that have more than four channels, receivers that have eight channels, receivers that have more than eight channels, and any other receiver considered suitable for a particular embodiment. Examples of ESCs considered suitable to include on a vehicle of a remotely controlled rescue system include ESCs that proportionally correspond to a motor to which the ESC is operatively connected. Examples of numbers of receivers and/or ESCs to include on a vehicle of a remotely controlled rescue system include one, at least one, two, a plurality, three, four, five, and any other number considered suitable for a particular embodiment. Optionally, a vehicle included in a remotely controlled rescue system can include one or more satellite receivers that can act as a redundancy should one of the other receivers included on the vehicle fail.

Each servo of the plurality of steering servos 54 is attached to the support frame 28 and is operatively connected to the first receiver 50 and a wheel of the plurality of wheels 44 such that the plurality of wheels 44 can be manipulated and steering of the vehicle 12 can be accomplished via the controller 20. In the illustrated embodiment, the plurality of steering servos 54 comprises two servos, each of which is a 19.5 kg/cm electromechanical servo that controls movement of a wheel of the plurality of wheels 44 during operation. The inclusion of two servos 54 is considered advantageous at least because such a configuration allows for more aggressive steering capabilities in deep snow relative to vehicles that do not include two steering servos and offers control over the vehicle should one servo malfunction.

While a plurality of steering servos 54 has been illustrated, a vehicle can include any suitable type and number of servos and selection of a suitable type and number of servos to include on a vehicle of a remotely controlled vehicle can be based on various considerations, including the number of features intended to be controlled. Examples of types of servos considered suitable to include on a vehicle of a remotely controlled rescue system include servos that are waterproof, and any other servo considered suitable for a particular embodiment. Examples of numbers of servos to include on a vehicle of a remotely controlled rescue system include one, at least one, two, a plurality, three, four, five, and any other number considered suitable for a particular embodiment. Optionally, a vehicle included in a remotely controlled rescue system can include three additional servos that control separate components of the vehicle and are in communication with a receiver. For example, a first servo can control the front differential, the second servo can control the rear differential, and the third servo can control the transfer case.

The energy storage device 56 is attached to the support frame 28 using Velcro straps and is operatively connected to the ESC 58 and each component in communication with and/or operatively connected to the ESC 58. The energy storage device 56 is configured to store energy and supply connected devices and/or components with the stored energy. In the illustrated embodiment, energy from the energy storage device 56 is supplied to the electronic speed control circuit (ESC) 58 and to each of the first receiver 50 and second receiver 52 such that the energy and instructions received from the controller 20 are relayed to the first motor 26 and other components in communication with the first receiver 50 or second receiver 52. The ESC 58 is operatively connected to the energy storage device 56 and the first receiver 50 such that the output of the first motor 26 can be controlled during use. Optionally, an energy storage device can be omitted from a vehicle included in a remotely controlled rescue system. For example, an external power source can be directly attached to a vehicle such that the various components requiring energy can be used as described herein. The energy storage device 56 can comprise any suitable energy storage device capable of storing electrical energy and providing electrical energy to an ESC, or any other device, component, or system, and selection of a suitable energy storage device to include in a vehicle can be based on various considerations, including the type of motor(s) and other components included in a remotely controlled rescue system. Examples of energy storage devices considered suitable to include in a vehicle that is a part of a remotely controlled rescue system include one or more batteries, single use batteries, rechargeable batteries, capacitors, ultracapacitors, and any other energy storage device considered suitable for a particular embodiment. In the illustrated embodiment, the energy storage device 56 is a 12.6V lithium polymer 175-amp three-cell battery.

Optionally, a vehicle included in a remotely controlled rescue system can include one or more toggle switches configured to activate one or more components, devices, and/or systems included on the remotely controlled rescue system. For example, a first toggle switch can be in communication with each of an energy storage device, ESC, and/or a receiver such that when the toggle switch is in the first configuration the ESC and/or receiver is in an off state and when the toggle switch is in a second configuration the ESC and/or receiver is in an on state, is receiving energy from the energy storage device, and can communicate with a controller.

As shown in FIGS. 1, 7, 8, 9, and 10, the main body 60 is attached to the support frame 28 and is disposed over, and covers, each of the first motor 26, the support frame 28, the transmission 30, the transfer case 32, the first drive shaft 34, the second drive shaft 36, the front differential 38, the rear differential 40, the first receiver 50, the second receiver 52, each steering servo of the plurality of steering servos 54, the energy storage device 56, the ESC 58, and a portion of each wheel axle of the plurality of wheel axles 42, the front suspension system 46, and the rear suspension system 48. The main body 60 has a front end 70, a rear end 71, a first side 72, a second side 73, and defines openings 74. Each opening 65 extends through a side of the main body 60 (e.g., first side 72, second side 73) and provides access to the underside of the main body 60. The main body 60 is attached to the support frame 28 using an elongate rod 75 that extends through each opening 65 and through a space defined by each spacer of the plurality of spacers 62. The elongate rod 75 is attached to the main body 60 using spring clips that pass through a portion of the elongate rod 65 that is disposed outside of the main body 60. In addition, a plurality of spring clips (not shown) is used to attach the main body 60 to the support frame 28 near the shock absorbers using vertical posts 76. In the illustrated embodiment, the main body 60 is formed of a foam material that is buoyant in water and covered in two to four layers of fiberglass. The main body 60 includes aluminum stock that is 3 millimeters thick and laminated between the layers of the fiberglass at locations where another component is attached to the main body 60, such as servos and/or the support frame.

While the main body 60 has been illustrated as having a particular structural arrangement and as being formed of a material that is buoyant in water that is covered in layers of fiberglass, a main body can have any suitable structural arrangement and can be formed of any suitable material. Selection of a suitable structural arrangement for a main body and material to form a main body can be based on various considerations, including the intended use of a remotely controlled rescue system in which the main body is a component. Examples of materials considered suitable to form a main body include metals, such as aluminum, alloys, polymers, plastics, thermoplastics, materials that are buoyant in water, fiberglass, materials that are buoyant in water and covered in layers of fiberglass, combinations of those described herein, and any other material considered suitable for a particular embodiment. Examples of numbers of layers of fiberglass considered suitable to cover a material that is buoyant in water to form a main body include one, at least one, two, a plurality, three, four, five, six, seven, eight, nine, ten, more than ten, and any other number considered suitable for a particular embodiment. For example, a main body included on a vehicle can be constructed of a material that is buoyant in water that is covered in between two layers and ten layers of fiberglass. It is considered advantageous to form a main body of a vehicle of a material that is buoyant in water at least because this provides a mechanism for making the vehicle buoyant in water such that it can be used to rescue a person. For example, the air disposed in each tire of a plurality of tires included on a vehicle, along with other material(s) that form main body, provide a vehicle that is buoyant in water and can be used by a person disposed at a rescue location for floatation purposes.

While the vehicle 12 included in the remotely controlled rescue system 10 has been illustrated as having a particular structural arrangement, as including various components, devices, and/or systems, and as including a motor 26 that produces ground propulsion, a remotely controlled rescue system can include a vehicle having any suitable structural arrangement, that includes any suitable number and type of components, devices, and/or systems, and that includes any suitable number of motors producing any suitable type of propulsion. Selection of a suitable vehicle and/or a suitable number and/or type of components, devices, systems, and/or motors to include in a remotely controlled rescue system can be based on various considerations, including the intended use of the remotely controlled rescue system. Examples of vehicles considered suitable to include in a remotely controlled rescue system include "off-the-shelf" remotely controlled vehicles, commercially-available remotely controlled vehicle kits, custom-built vehicles using commercially available and/or custom-fabricated remotely controlled vehicle expansion components, remotely controlled vehicles that include wheels, remotely controlled vehicles that include a treads or track plates driven by two or more wheels (e.g., continuous track), remotely controlled vehicles that include blowers (e.g., air-cushion vehicles), remotely controlled cars, remotely controlled trucks, remotely controlled boats, remotely controlled aircraft, and any other remotely controlled vehicle considered suitable for a particular embodiment. For example, a vehicle included in a remotely controlled rescue system can be scaled according to its intended use. In embodiments that include a continuous track instead of a plurality of wheels, the remotely controlled rescue system can include an articulated tread assembly that allows the remotely controlled rescue system to navigate a variety of flat and inclined terrains providing enhanced navigational capabilities in various environments. Examples of numbers of motors considered suitable to include on a vehicle include one, at least one, two, a plurality, three, four, five, six, and any other number considered suitable for a particular embodiment. Examples of forms of propulsion considered suitable for a motor included on a vehicle to produce include ground propulsion, marine propulsion, air propulsion, and any other form of propulsion considered suitable for a particular embodiment.

Figure 8:
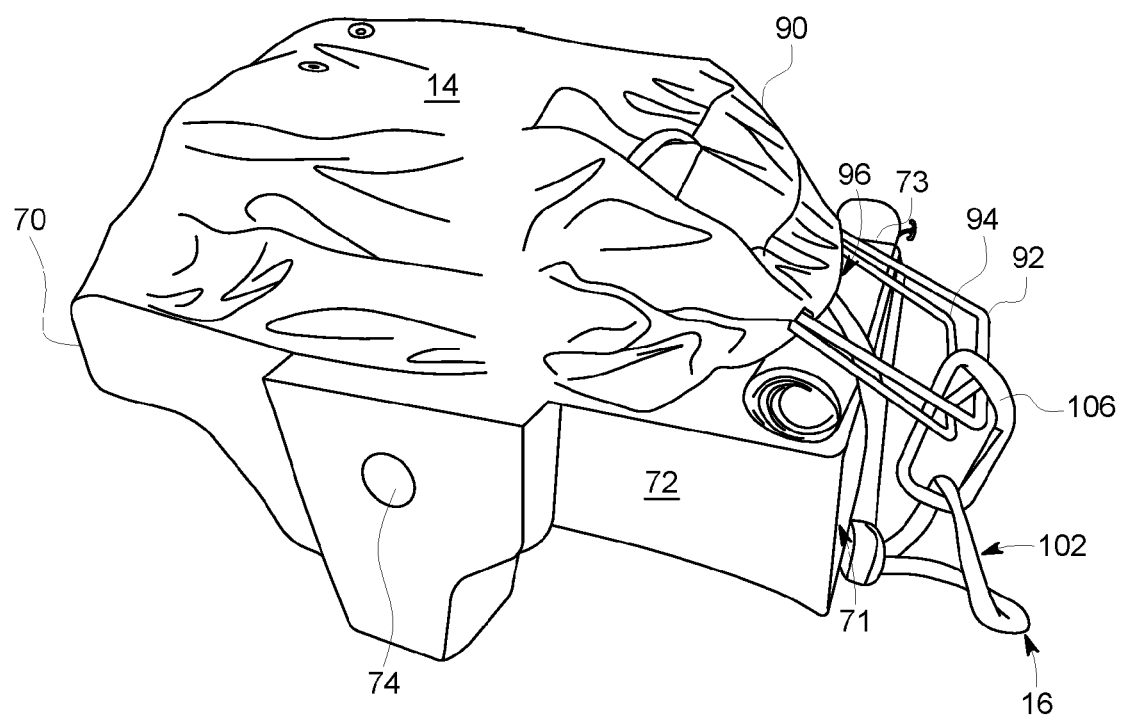
FIG. 8 is a perspective view of a portion of the vehicle, the storage container, the cord, and the personal floatation device of the remotely controlled rescue system illustrated in FIG. 1.
Figure 10:
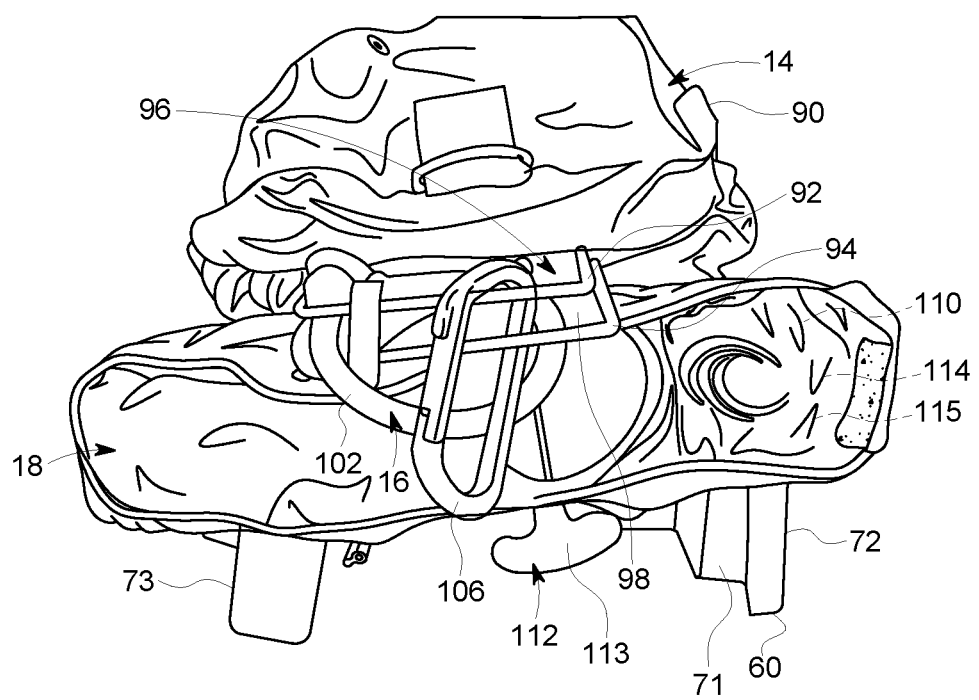
FIG. 10 is another perspective view of the portion of the vehicle, the storage container, the cord, and the personal floatation device illustrated in FIG. 8.

Each of the storage container 14 and personal floatation device 18 is disposed on, and attached to, the main body 60. As shown in FIGS. 8 and 10, the storage container 14 includes a main body 90, a first handle 92, and a second handle 94 and is formed of a flexible material. The main body 90 defines a cavity 96 and an opening 98 that provides access to the cavity 96. The cavity 96 is sized and configured to house the cord 16 (e.g., portion of the cord 16, entirety of the cord 16), as described in more detail herein. The opening 98 is directed away from the front end 70 of the main body 60 of the vehicle 12 such that when the cord 16 is disposed in the storage container 14 it can be removed by applying an axial force on the cord 16 in a direction away from the front end 70 of the main body 60 of the vehicle 12, or by maintaining the position of the cord 16 and advancing the vehicle 12 in a direction away from the cord 12. Each of the first handle 92 and second handle 94 is attached to the main body 90, extends from the main body 90 and away from the cavity 96, and is sized and configured to receive a portion of the hand of a user. In the illustrated embodiment, the main body 90 of the storage container 14 is formed of waterproof nylon and is sized and configured to carry at least 60 meters of a cord.

While the storage container 14 has been illustrated as having a particular structural arrangement, as including first and second handles 92, 94, as being attached to the main body 60, and as being formed of a particular material, a storage container included in a remotely controlled rescue system can have any suitable structural arrangement, include any suitable number of handles, be attached to any suitable portion of a vehicle, and be formed of any suitable material. Selection of a suitable structural arrangement, number of handles, location to attach, and material to form a storage container can be based on various considerations, including the intended use of a remotely controlled rescue system of which the storage container is a component. For example, a storage container can alternatively have a main body that defines a recess within which a cord is disposed and that can be introduced and removed from the main body using manual or automated control. Examples of numbers of handles considered suitable to include on a storage container include zero, one, at least one, two, a plurality, three, four, and any other number considered suitable for a particular embodiment. Examples of locations considered suitable to attach a storage container on a vehicle include on a top surface of a main body, on a side of the main body, on a bottom surface of a main body, at the front end of a main body, between the front end and the rear end of a main body, at the rear end of a main body, and any other location considered suitable for a particular embodiment. Examples of materials considered suitable to form a storage container include nylon, waterproof nylon, reflective materials, synthetic materials, natural materials, leather, rigid materials, flexible materials, and any other material considered suitable for a particular embodiment. Examples of techniques and methods of attachment considered suitable between a storage container and a main body of a vehicle include using attachment members, such as screws, nuts, and/or bolts, welding and/or fusing components to one another, using an adhesive, and/or any other technique or method of attachment considered suitable for a particular embodiment. In alternative embodiments, a storage container can be omitted from a remotely controlled rescue system and the second end of a cord can be directly attached to a portion of the remotely controlled rescue system (e.g., a portion of a vehicle, personal floatation device).

In the illustrated embodiment, the cord 16 is partially disposed within the storage container 14 and comprises a first end 102, a second end (not shown), and a length (not shown) that extends from the first end 102 to the second end (not shown). The first end 102 is attached to a portion of the remotely controlled rescue system 10. In the illustrated embodiment, the first end 102 of the cord 16 is attached to the first handle 92 of the storage container 14 using a carabiner 106 and by tying the cord 16 in a knot on the carabiner 106 (e.g., passing the first end 102 of the cord 16 through the passageway defined by the carabiner 106 and attaching the first end 102 to a portion of the cord 16). The second end (not shown) of the cord 16 is sized and configured to be attached to an object, as described in more detail herein, such that the cord 16 can be used to rescue a person located at a rescue location. The cord 16 is formed of a synthetic material that is buoyant in water and, in the illustrated embodiment, has a length (not shown) that is equal to about 60 meters.

While the cord 16 has been illustrated as being partially disposed with the storage container 14, formed of a synthetic material that is buoyant in water, as having a particular length, and as being attached to the first handle 92 of the storage container 16 using a carabiner 106, a cord included in a remotely controlled rescue system can be positioned on a vehicle relative to a storage container in any suitable manner, can be formed of any suitable material, have any suitable length, and be attached to any suitable portion of a remotely controlled rescue system. Selection of a suitable location to position a cord relative to a storage container, material to form a cord, length for a cord, and location to attach a cord on a remotely controlled rescue system can be based on various considerations, including the material that forms the cord and the structural arrangement of a vehicle included in a remotely controlled rescue system of which the cord is a component. For example, in alternative embodiments, a cord can be entirely disposed within a storage container and a user can remove a portion of the cord and attach the first end of the cord to a portion of the remotely controlled rescue system before use. Examples of materials considered suitable to form a cord include synthetic materials, natural materials, materials that are buoyant in water, synthetic materials that are buoyant in water, natural materials that are buoyant in water, and any other material considered suitable for a particular embodiment. Examples of lengths of a cord considered suitable to include in a remotely controlled rescue system include lengths equal to about, less than, greater than, or about 20 meters, 30 meters, 40 meters, 50 meters, 60 meters, 70 meters, 80 meters, 90 meters, 100 meters, lengths greater than 100 meters, and any other length considered suitable for a particular embodiment. Examples of locations considered suitable to attach a first end of a cord to a portion of a remotely controlled rescue system include to a storage container, a handle of a storage container, a portion of a storage container, a portion of a personal floatation device, a portion of a vehicle, the main body of a vehicle, a support frame of a vehicle, combinations of those described, and any other location considered suitable for a particular embodiment. Examples of techniques and methods of attachment considered suitable between a cord and a portion of a remotely controlled rescue system include tying a portion of the cord in a loop and attaching an end to a portion of the cord using adhesive or a knot, using other components, such as a carabiner, and any other technique or method of attachment considered suitable for a particular embodiment. Alternative embodiments of a remotely controlled rescue system can include a funnel attached to a storage container that is in communication with the cavity of the storage container. In these embodiments, the second end of the cord is passed through the funnel such that when the vehicle is navigated toward a person at a rescue location, the rope is passed through the funnel and avoids contact with the plurality of wheels or other objects.

A cord included in a remotely controlled rescue system can comprise any suitable elongate member that is sized and configured to assist with the rescue of a person disposed at a rescue location. Selection of a suitable cord to include a remotely controlled rescue system can be based on various considerations, including the intended use of the remotely controlled rescue system. Examples of cords considered suitable to include in a remotely controlled rescue system include ropes, single ropes, double ropes, ropes formed of materials that are buoyant in water, wire members, chains, and any other cord considered suitable for a particular embodiment. In the illustrated embodiment, the cord 16 comprises a rope.

In the illustrated embodiment, the personal floatation device 18 is attached to the main body 60 of the vehicle 12 between a portion of the storage container 14 and the rear end 71 of the main body 60. As shown in FIG. 10, the personal floatation device 18 comprises an inflatable vest 110 that is operatively connected to an actuator 112 and an inflation system 114. The inflatable vest 110 is moveable between a deflated configuration and an inflated configuration. In the illustrated embodiment, the actuator 112 is a pull cord 113 and the inflation system 114 is a $CO_2$ cartridge 115. The pull cord 113 has a first configuration and a second configuration. When the pull cord 113 is in the first configuration, the inflatable vest 110 is in the deflated configuration and the $CO_2$ cartridge 115 is prevented from introducing $CO_2$ into the inflatable vest 110. When the pull cord 113 is in the second configuration, the inflatable vest 110 is in the inflated configuration and the $CO_2$ cartridge 115 introduces $CO_2$ into the inflatable vest 110 such that it becomes inflated. In use, the personal floatation device 18 can be activated remotely using the controller 20 or can be activated by the person being rescued applying an axial force on the actuator 112 that is directed away from the inflatable vest 110. In embodiments in which it is desired to remotely activate a personal floatation device, a vehicle can include a personal floatation device servo that is operatively connected to a receiver (e.g., second receiver), an energy storage device, and the personal floatation device (e.g., using an elongate rod operatively connected to the servo and the inflation system 114). In these embodiments, movement of the personal floatation device between the deflated and inflated configurations can be controlled using a controller included in the remotely controlled rescue system, as described in more detail herein.

While the personal floatation device 18 has been illustrated as having a particular structural arrangement and as being attached to the main body 60 between a portion of the storage container 14 and the rear end 71 of the main body 60, a personal floatation device included in a remotely controlled rescue system can have any suitable structural arrangement and be attached to any suitable portion of a vehicle. Selection of a suitable structural arrangement for a personal floatation device and location to attach a personal floatation device can be based on various considerations, including the intended use of a remotely controlled rescue system of which the personal floatation device is a component. Examples of locations considered suitable to attach a personal floatation device on a vehicle include on a top surface of a main body, on a side of the main body, on a bottom surface of a main body, at the front end of a main body, between the front end and the rear end of a main body, at the rear end of a main body, between the storage container and the rear end of the main body, between the front end of the main body and the storage container, and any other location considered suitable for a particular embodiment. Examples of personal floatation devices considered suitable to include in a remotely controlled rescue system include Type 3 personal floatation devices, coast guard approved personal floatation devices, and any other personal floatation device considered suitable for a particular embodiment. In the illustrated embodiment, the personal floatation device 18 is a type 3 personal floatation device that is coast guard approved.

Figure 11:
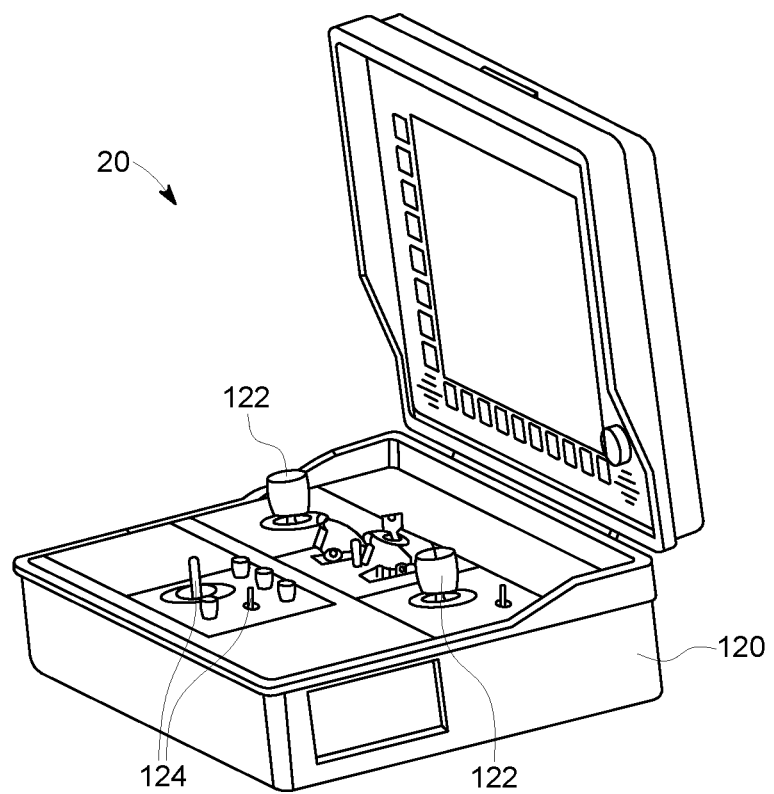
FIG. 11 is a perspective view of the controller of the remotely controlled rescue system illustrated in FIG. 1.

FIG. 11 illustrates the controller 20 that is configured to remotely control movement of the vehicle 12 by sending command signals over one or more radio channels to each of the first receiver 50 and the second receiver 52 and the components, devices, and systems attached to each of the first receiver 50 and the second receiver 52. In the illustrated embodiment, the controller 20 is a 2.4 GHz radio control device 120 that is in communication with each of the first receiver 50 and the second receiver 52 and includes a plurality of user-manipulable control sticks 122 and a plurality of switches 124 for controlling features of the controller 20 and/or vehicle 12 in a desired manner. Each of the control sticks 122 is manipulated to control each servo of the plurality of steering servos 54 and the first motor 26. In embodiments in which a personal floatation device is operably connected to a personal floatation device servo, a control stick, or other portion of a controller, can control the personal floatation device servo and inflate the inflatable vest.

A controller included in a remotely controlled rescue system can be any suitable controller capable of sending command signals to a receiver included on a remotely controlled rescue system such that control of the one or more motors and/or servos, or other components, devices, and/or systems included on the remotely controlled rescue system can be accomplished. Selection of a suitable controller to include in a remotely controlled rescue system can be based on various considerations, including the number and/or type of receivers, motors, servos, components, devices, and/or systems included in the remotely controlled rescue system. Examples of controllers considered suitable to include in a remotely controlled rescue system include commercially-available radio control devices that comprise a transmitter capable of transmitting command signals on radio channels compatible with those utilized by the one or more receivers included in a vehicle, programmable radio control devices wherein each radio channel corresponds to a controlled feature of a vehicle and may be assigned to the one or more control sticks and/or switches in accordance with a control scheme selected by the user, programmable pulse code modulation (PCM) radio control devices, and any other controller considered suitable for a particular embodiment.

Alternative embodiments of a remotely controlled rescue system can include one or more cameras (e.g., video cameras) to provide assistance during a rescue operation. When included, a camera (e.g., video camera) includes a transmitter for transmitting real-time video images from the vicinity of a vehicle to which the camera is attached and a corresponding receiver for receiving the video images and generating a video such that the camera is wireless. The camera, transmitter, and receiver may be similar to those used for surveillance activities and designed for battery-powered operation. According to various embodiments, the camera may include an integral microphone for transmitting sound with the video images. A user of a vehicle that includes a camera may view the video images and listen to the accompanying audio via a video display in communication with the receiver that can be separate from, or included on, a controller. A camera included in a remotely controlled rescue system can be mounted in a stationary manner to a vehicle so as to provide an unobstructed view. In these embodiments, it is desirable to mount the camera to the front of the vehicle, the rear of the vehicle, or on a downward facing surface (e.g., on a frame, on a bottom plate) to improve navigational capabilities. According to other embodiments, the camera can be mounted using one or more servos connected to a receiver and operated using a controller allowing the camera to be selectively oriented with respect to the vehicle. For example, a single servo may be used to control the camera orientation through a single plane by rotating the camera or allowing it to pivot. Alternatively, two servos may be used to control the camera orientation in each of at least two planes combining rotational and pivotal movement. The camera may also be mounted and operatively connected to an energy storage device to permit continuous or intermittent oscillation so that it pans an area of interest. To permit use of a remotely controlled rescue system in low-light conditions, the camera may include night vision capabilities.

Alternative embodiments of a remotely controlled rescue system can include a controller that controls the components of the remotely controlled rescue system across a computer network (e.g., the Internet). For example, a first computer in the vicinity of the remotely controlled rescue system can be configured to receive control commands from a second computer associated with the user via the network and to provide the received control commands to the remotely controlled rescue system through the controller. In embodiments that include a camera, the receiver that is in communication with a camera can also be in communication with the first computer and provide video images captured by the camera and/or sounds detected by audio equipment from the vicinity of interest by the vehicle to the second computer via the network. In these embodiments, a user that is positioned at a location that is not in the vicinity of the person located at the rescue location can operate the remotely controlled rescue system to assist the person.

Optionally, a remotely controlled rescue system can include one or more communications devices to provide communication between a personal being rescued and the rescuer(s). For example, a first communication device can be attached to an energy storage device of a vehicle of a remotely controlled rescue system and a second communication device can be in the possession of a rescuer. The first communication device is attached to the vehicle (e.g., underneath the main body, behind a crash plate) and is in communication with the second communication device. An example of a first communication device and second communication device considered suitable to include in a remotely controlled rescue system includes communications devices that provide an open-channel two-way radio (e.g., VHF radio). Open-channel two-way radios are considered advantageous at least because these device do not require the person being rescued to push down on any button to communication with a rescuer(s). Activating each of the first communication device and second communication device can be achieved during activation of a remotely controlled rescue system. For example, the first communication device can be attached to a receiver such that when the receiver is activated, the first communication device is activated. The second communication device can be activated (e.g., turned on) by a rescuer when it is desired to communicate with a persona being rescued.

Figure 12:
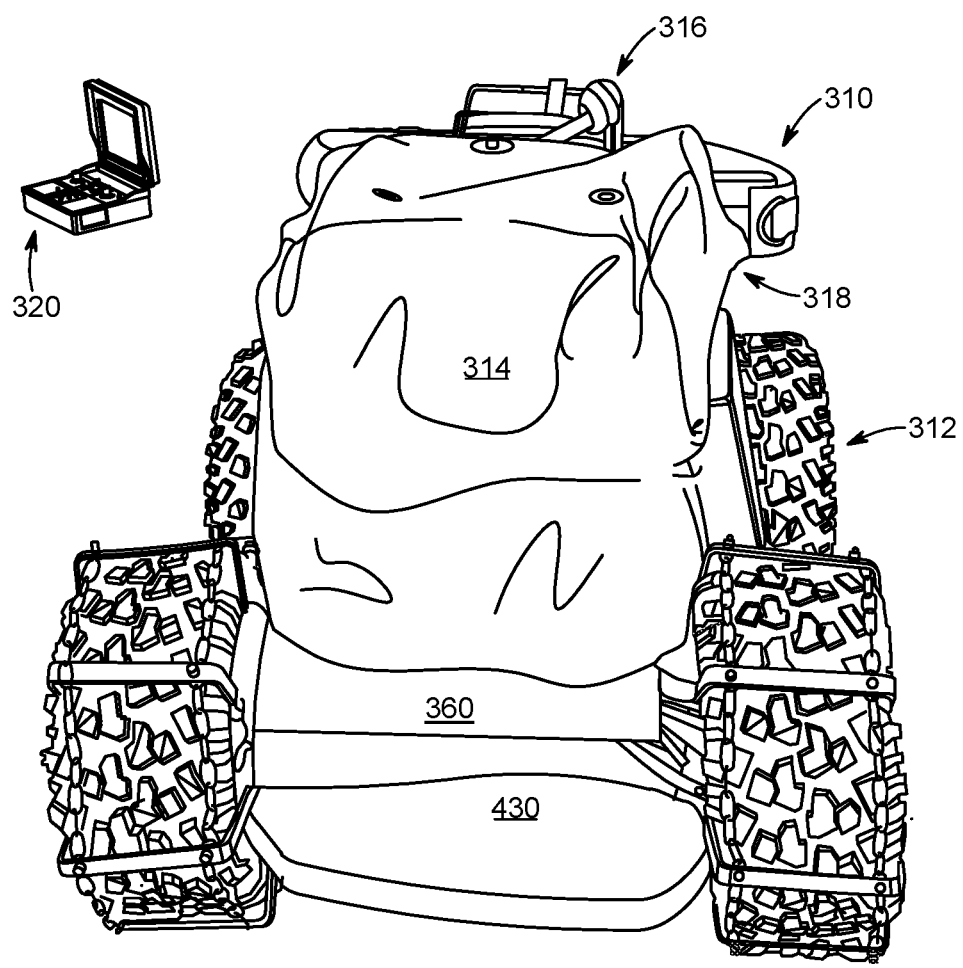
FIG. 12 is a perspective view of a second example remotely controlled rescue system.
Figure 13:
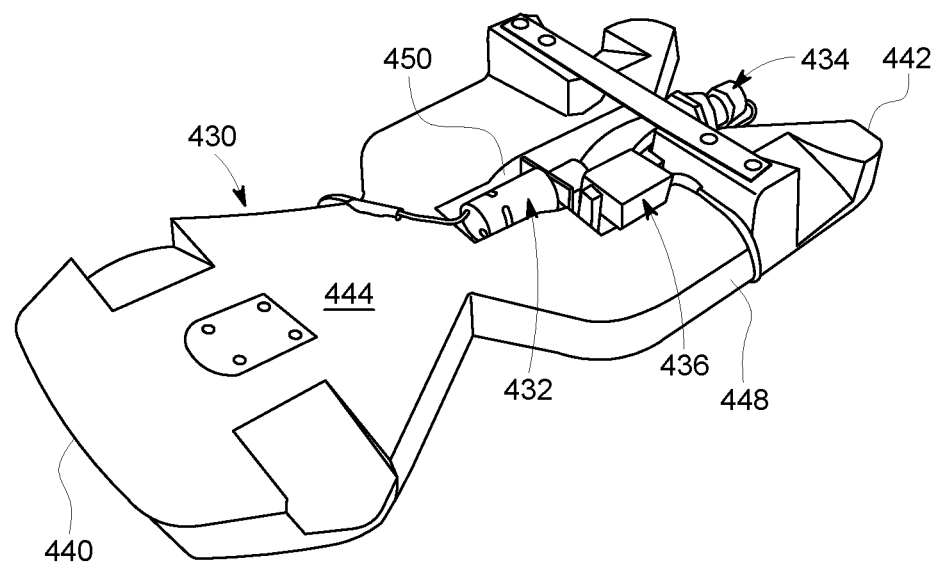
FIG. 13 is a perspective view of the bottom plate of the vehicle of the remotely controlled rescue system illustrated in FIG. 12.
Figure 14:
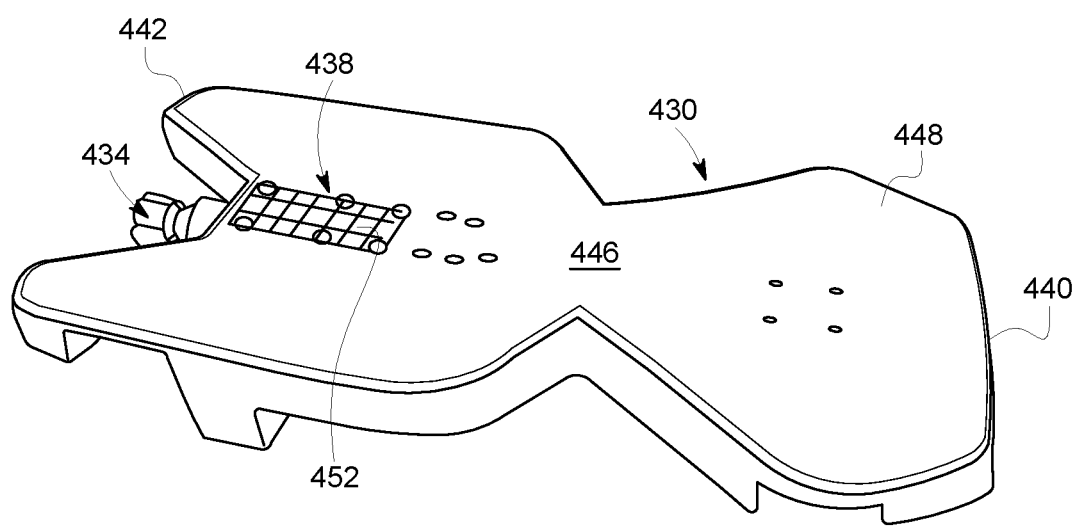
FIG. 14 is another perspective view of the bottom plate illustrated in FIG. 13.

FIGS. 12, 13, and 14 illustrate another example remotely controlled rescue system 310. The remotely controlled rescue system 310 is similar to the remotely controlled rescue system 10 illustrated in FIGS. 1, 2, 3, 4, 5, 6, 7, 8, 9, 10, and 11 and described above, except as detailed below. The remotely controlled rescue system 310 includes a vehicle 312, a storage container 314, a cord 316, a personal floatation device 318, and a controller 320. In the illustrated embodiment, the vehicle 312 of the remotely controlled rescue system 310 includes a bottom plate 430, a second electronic speed control circuit (ESC) (not shown), a second motor 432, a nozzle 434, a marine servo 436, and a grate 438.

In the illustrated embodiment, the bottom plate 430 is formed of a material that is buoyant in water and is attached to the first deck 362 of the support frame 328. The bottom plate 430 has a front end 440, a back end 442, a top surface 444, a bottom surface 446, and a main body 448 that defines a recess 450 and a passageway 452. The recess 450 extends into the bottom surface 446 toward the top surface 444 and from the back end 442 toward the front end 440. The recess 450 is sized and configured to receive a portion of the second motor 432 and the nozzle 434. The passageway 452 extends from the bottom surface 446 to the recess 450 such that the passageway 452 is in communication with the recess 450. The passageway 452 acts as a water intake and is sized and configured to allow fluid (e.g., water) to pass through the passageway 452 and into the recess 450 such that the second motor 432 can produce propulsion, as described in more detail herein. In the illustrated embodiment, the passageway 452 is about 7 centimeters long and about 3 centimeters wide. In the illustrated embodiment, the bottom plate 430 is formed of a foam material that is buoyant in water and covered in two to four layers of fiberglass. The bottom plate 430 includes aluminum stock that is 3 millimeters thick and laminated between the layers of the fiberglass, or attached to a surface of the bottom plate 430, at locations where another component is attached to the bottom plate 430, such as servos and/or the support frame.

While the bottom plate 430 has been illustrated as having a particular structural arrangement and as being formed of a material that is buoyant in water and covered in layers of fiberglass, a bottom plate can have any suitable structural arrangement and can be formed of any suitable material. Selection of a suitable structural arrangement for a bottom plate and material to form a bottom plate can be based on various considerations, including the intended use of a remotely controlled rescue system in which the bottom plate is a component. Examples of materials considered suitable to form a bottom plate include metals, such as aluminum, alloys, polymers, plastics, thermoplastics, materials that are buoyant in water, fiberglass, materials that are buoyant in water and covered in layers of fiberglass, combinations of those described herein, and any other material considered suitable for a particular embodiment. Examples of numbers of layers of fiberglass considered suitable to cover a material that is buoyant in water to form a bottom plate include one, at least one, two, a plurality, three, four, five, six, seven, eight, nine, ten, more than ten, and any other number considered suitable for a particular embodiment. It is considered advantageous to form a bottom plate and/or a main body of a vehicle of a material that is buoyant in water at least because this provides a mechanism for making the vehicle buoyant in water such that it can be used to rescue a person.

The second ESC is disposed in a waterproof composite clamshell box that is attached to the underside of the main body 360 using three screws and lock nuts. The second ESC is operatively connected to the energy storage device and the second receiver such that the output of the second motor (not shown) can be controlled during use. It is considered advantageous to position the second ESC on the underside of the main body 360 to avoid contact with water.

In the illustrated embodiment, the second motor 432 is attached to the bottom plate 430 within the recess 450 and produces a second form of propulsion, which, in the embodiment illustrated, is marine propulsion. The second motor 432 is operatively connected to the second receiver and the marine servo 436 and is attached to the bottom plate 430 using six screws. The second form of propulsion is different from the first form of prolusion, which in the embodiment illustrated, is ground propulsion. The inventor has determined that inclusion of a second motor that produces a form of propulsion that is different from a form of propulsion produced by a first motor is considered advantageous at least because provides a mechanism for traversing various forms of material during use. For example, during rescue operations there is frequently open water between a rescuer and the person located at a rescue location. The inclusion of two motors that produce different forms of propulsion results in an amphibious remotely controlled rescue system that allows for the remotely controlled rescue system to traverse both ground terrain and open water to deliver various components of the system to a person located at the rescue location.

In the illustrated embodiment, the second motor 432 comprises an 11.1 Volt, 21-turn electric motor with a jet drive that is operatively connected to and controlled by the second receiver and the second ESC. The second ESC is a 60-amp electronic speed control circuit that spins the second motor 432 impeller at up to 25,000 rpm, via the second receiver. While the second motor 432 has been illustrated as an electric motor, a vehicle can include any suitable motor capable of producing marine propulsion and selection of a suitable motor can be based on various considerations, including the intended use of the remotely controlled rescue system. Examples of motors considered suitable to include in a remotely controlled rescue system include combustion engines, such as commercially-available combustion engines typically used in hobby applications and powered by a fuel mixture comprising one or more of methanol, nitromethane, and/or oil, electric motors, motors that include any suitable drive, such as propellers, and any other motor considered suitable for a particular embodiment.

In the illustrated embodiment, the nozzle 434 is operatively connected to the second motor 432 and the marine servo 436 and is configured to manipulate the flow of fluid (e.g., water) through the second motor 432 during use to control the direction of the vehicle's 312 travel. The inventor has determined that the inclusion of a motor with a jet drive is advantageous at least because this type of motor prevents injury (e.g., laceration) to a person being rescued since it omits the inclusion of propellers and has no external moving parts.

As shown in FIG. 13, the marine servo 436 is attached to the top surface 444 of the bottom plate 430 and is operatively connected to each of the second motor 432, the nozzle 434, and the second receiver 352. In the illustrated embodiment, the marine servo 436 is a 161 oz/in. waterproof servo and is linked to the nozzle using a 10-centimeter long, 3-millimeter diameter, stainless steel rod. The marine servo 436 operates the second motor 432 and the nozzle 434 in accordance with control commands transmitted from the controller 320.

As shown in FIG. 14, the grate 438 is attached to the bottom surface 446 of the bottom plate 430 and is sized and configured to cover the passageway 452. In the illustrated embodiment, the grate 438 is formed of 1 centimeter square steel wire. It is considered advantageous to include a grate 438 at least because it prevents objects (e.g., seaweed, debris) from being introduced into the second motor 432 during use. While a particular structural configuration has been illustrated for the grate 438, a grate can have any suitable structural arrangement and selection of a suitable structural configuration can be based on various considerations, such as the materials disposed in a body of water within which a remotely controlled rescue system is intended to be used.

Optionally, a vehicle included in a remotely controlled rescue system can include one or more toggle switches configured to activate one or more components, devices, and/or systems included on the remotely controlled rescue system. For example, a vehicle can include two energy storage devices that are each in communication with a separate ESC. A first toggle switch can be operatively connected to a first energy storage device and a first ESC and a second toggle switch can be operatively connected to a second energy storage device and a second ESC. When the first toggle switch is in the first configuration the first ESC and the receiver operatively connected to the first ESC is in an off state and when the first toggle switch is in a second configuration the first ESC and the receiver operatively connected to the first ESC is in an on state, is receiving energy from the energy storage device, and can communicate with a controller. When the second toggle switch is in the first configuration the second ESC and the receiver operatively connected to the second ESC is in an off state and when the second toggle switch is in a second configuration the second ESC and the receiver operatively connected to the first ESC is in an on state, is receiving energy from the energy storage device, and can communicate with a controller. In this embodiment, each of a first motor and second motor can be toggled on an off separately and are operatively connected to separate ESCs such that the output of each motor can be separately regulated. Alternative embodiments, however, can include a single ESC that is operatively connected to each motor of a vehicle and/or can include multiple energy storage devices operatively connected to a single ESC, or separate ESCs.

Figure 15:
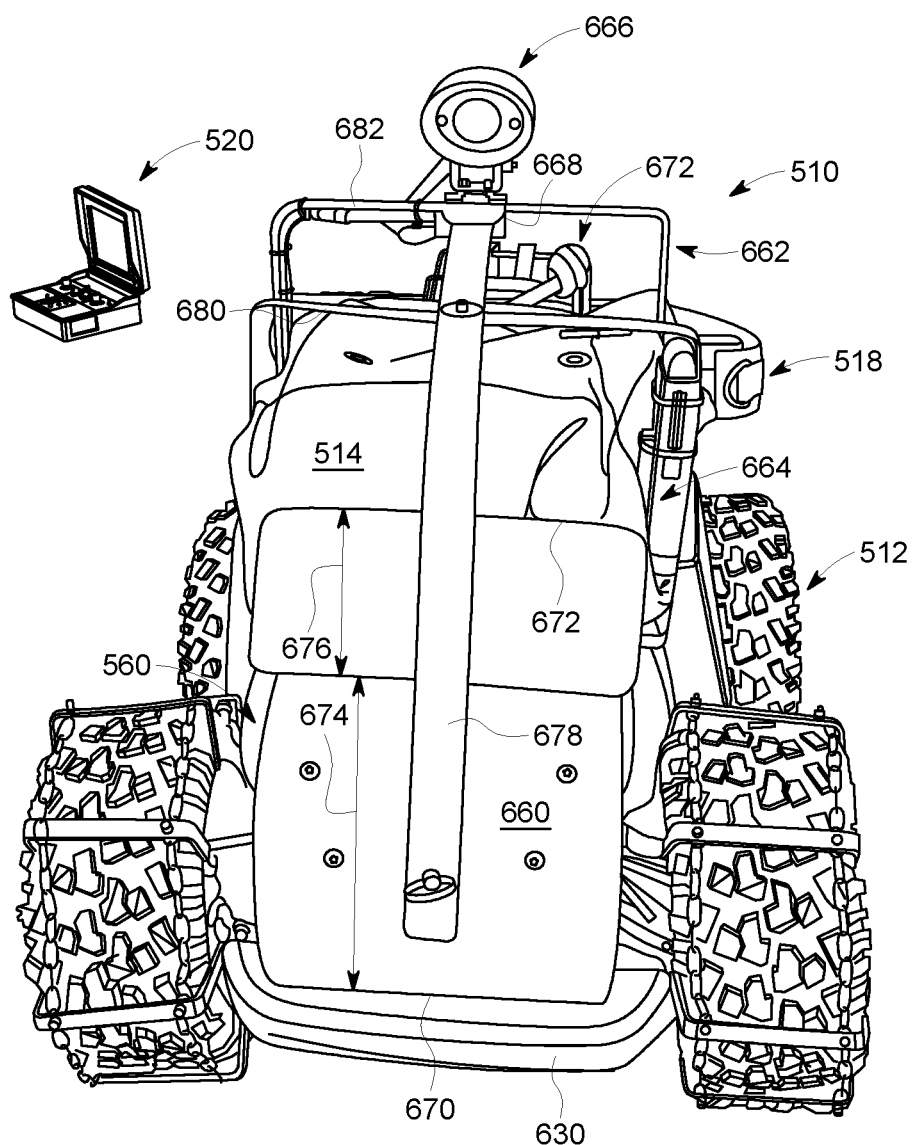
FIG. 15 is a perspective view of a third example remotely controlled rescue system.

FIG. 15 illustrates another example remotely controlled rescue system 510. The remotely controlled rescue system 510 is similar to the remotely controlled rescue system 310 illustrated in FIGS. 12, 13, and 14 and described above, except as detailed below. The remotely controlled rescue system 510 includes a vehicle 512, a storage container 514, a cord 516, a personal floatation device 518, a controller 520, a bottom plate 630, a second motor (not shown), a nozzle (not shown), a marine servo (not shown), and a grate (not shown). In the illustrated embodiment, the vehicle 512 of the remotely controlled rescue system 510 includes a crash plate 660, a handle 662, a strobe light 664, a spotlight 666, and a spotlight servo 668.

In the illustrated embodiment, the crash plate 660 is attached to the main body 560 of the vehicle 512 and has a first end 670, a second end 672, a first portion 674, and a second portion 676. The first portion 674 extends from the first end 670 toward the second end 672 and is curved along its length. The second portion 676 extends from the first portion 674 to the second end 672 and is linear along its length. This structural arrangement provides a mechanism for deflecting any debris that comes into contact with the crash plate 660 during use over the vehicle 512 to prevent damage to any of the components, devices, and/or systems included on the remotely controlled rescue system 510. The crash plate 660 is formed of a sheet of aluminum that has been shaped into a desired configuration and covered in multiple layers of fiberglass.

While the crash plate 660 has been illustrated as having a particular structural arrangement and as being formed of a sheet of aluminum covered in multiple layers of fiberglass, a crash plate can have any suitable structural arrangement and can be formed of any suitable material. Selection of a suitable structural arrangement for a crash plate and material to form a crash plate can be based on various considerations, including the intended use of a remotely controlled rescue system in which the crash plate is a component. Examples of materials considered suitable to form a crash plate include metals, such as aluminum, aluminum covered in multiple layers of fiberglass, alloys, polymers, plastics, thermoplastics, materials that are buoyant in water, fiberglass, materials that are buoyant in water and covered in layers of fiberglass, combinations of those described herein, and any other material considered suitable for a particular embodiment. Examples of numbers of layers of fiberglass considered suitable to cover a sheet of aluminum to form a crash plate include one, at least one, two, a plurality, three, four, five, six, seven, eight, nine, ten, more than ten, and any other number considered suitable for a particular embodiment.

In the illustrated embodiment, the handle 662 is attached to the crash plate 660 and the main body 560 of the vehicle 512 and has a first portion 678, a second portion 680, and a third portion 682. The first portion 678 extends from the crash plate 660, over a portion of the storage container 514, and is attached to each of the second portion 680 and the third portion 682. The second portion 680 is attached to the first portion 678, is disposed at an angle equal to about 90 degrees relative to the first portion 680, is disposed over a portion of the storage container 514, and is attached to the support frame (not shown). The third portion 682 is attached to the first portion 678, is disposed at an angle equal to about 90 degrees relative to the first portion 678, is disposed over a portion of the storage container 514, and is attached to the support frame (not shown). In the illustrated embodiment, each of the first portion 678, the second portion 680, and the third portion 682 of the handle 662 is about 2.5 centimeter wide, about 2 millimeters thick, and is formed of a piece of aluminum that has a rectangular cross-sectional configuration. In the illustrated embodiment, the main body 560 includes pieces of metal stock disposed between the fiberglass layers that form the main body 560 to provide support for the attachment points between the main body 560 and the crash plate 660 and between the main body 560 and the handle 662. It is considered advantageous to include a handle on a vehicle of a remotely controlled rescue system at least because the handle protects various components of the remotely controlled rescue system (e.g., vehicle, storage container, personal floatation device) and it provides a structure that can be used to carry and/or transport the vehicle from one location to another.

In the illustrated embodiment, each of the strobe light 664, the spotlight 666, and the spotlight servo 668 is attached to the handle 662. The strobe light 664 is attached to the second portion 680 of the handle 662 and includes its own energy storage device and toggle switch to move between on and off states. Alternatively, the strobe light 664 can be attached to a receiver of a vehicle such that it can be moved between its on and off states upon movement of the receiver between its on and off states. Each of the spotlight 666 and the spotlight servo 668 is attached to the third portion 682 of the handle 662 and operatively connected to the energy storage device 556 and the second receiver (not shown) such that each of the spotlight 666 and the spotlight servo 668 can be moved between its on and off states upon movement of the second receiver between its on and off states. The spotlight 666 is pivotably attached to the handle 662 such that it can rotate relative to the vehicle 512. The spotlight servo 668 is attached to the handle 662 adjacent the spotlight 666 and is operatively connected to the spotlight 666. The spotlight servo 668 is operated using the controller 520 and selectively orients the spotlight 666 with respect to the vehicle 512. While described as pivotable using a single servo, alternative embodiments can include a spotlight that can be stationary, manipulated manually, or be movable using more that one servo.

A vehicle included in a remotely controlled rescue system can include any suitable number and type of strobe lights and/or stoplights and selection of a suitable number and type of strobe lights and/or spotlights to include on a vehicle can be based on various considerations, including the intended use of the remotely controlled rescue system. Examples of strobe lights and spotlights considered suitable to include on a vehicle include infrared strobe lights, coast guard approved strobe lights, single-direction spotlights, multi-directional spotlights, and any other strobe light and/or spotlight considered suitable for a particular embodiment. It is considered advantageous to include an infrared strobe and/or spotlight on a vehicle at least because the inclusion of an infrared strobe and/or spotlight allows rescuers to visualize a person being rescued and the vehicle of a remotely controlled rescue system in the dark.

Various methods of rescuing a person are described herein. While the methods described herein are shown and described as a series of acts, it is to be understood and appreciated that the methods are not limited by the order of acts, as some acts may in accordance with these methods, occur in different orders, and/or concurrently with other acts described herein.

Figure 16:
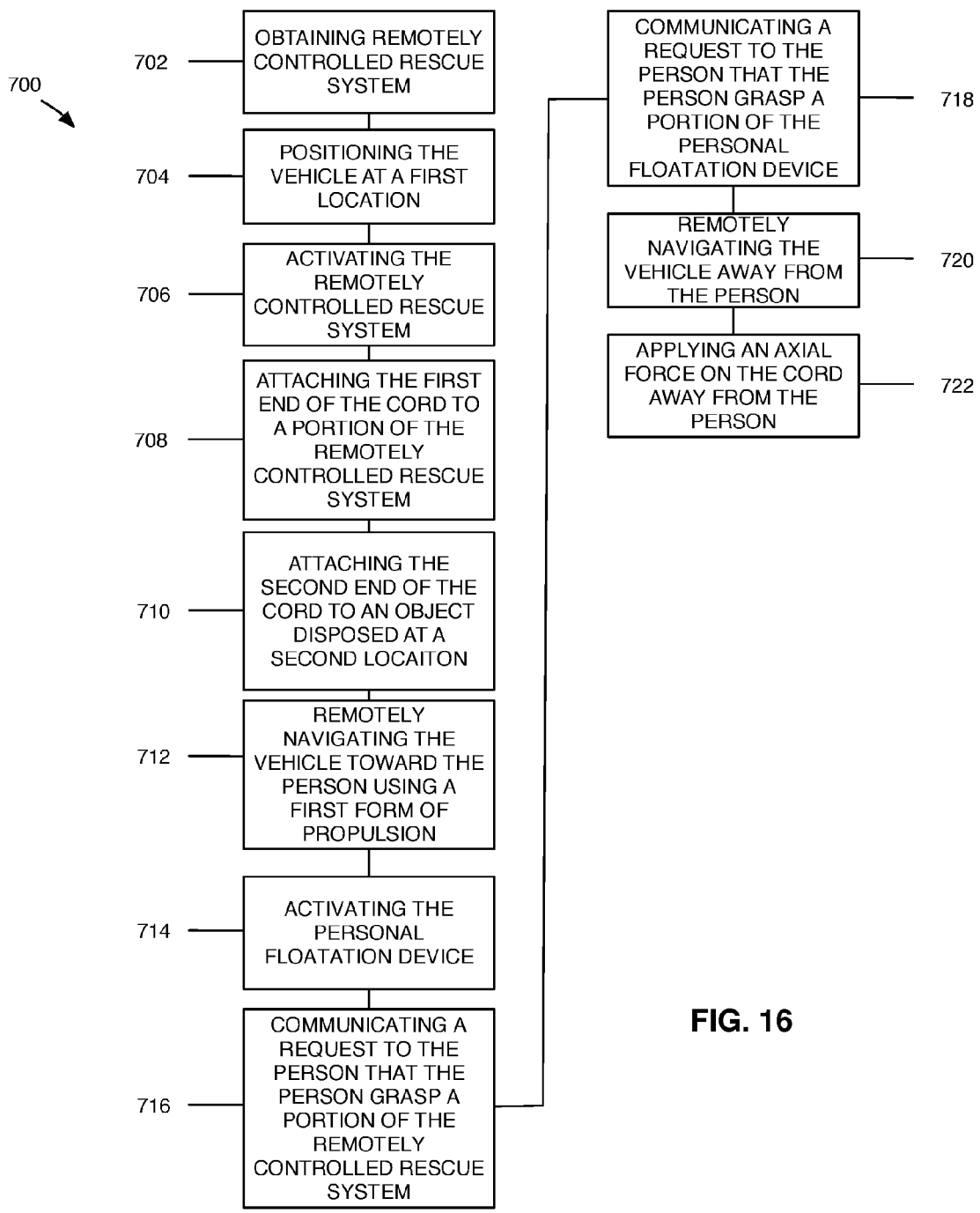
FIG. 16 is a schematic illustration of an example method of rescuing a person using a remotely controlled rescue system.

FIG. 16 is a schematic illustration of a method 700 of rescuing a person disposed at a rescue location. In the example described herein, the rescue location is disposed on a partially frozen lake.

An initial step 702 comprises obtaining a remotely controlled rescue system. The remotely controlled rescue system has a vehicle, a storage container attached to the vehicle, a cord disposed within the storage container, a personal floatation device attached to the vehicle, and a controller for remotely controlling the movement of the vehicle. The vehicle has a first motor that produces a first form of propulsion and a second motor that produces a second form of propulsion that is different from the first form of propulsion. The cord has a first end and a second end. Another step 704 comprises positioning the vehicle of the remotely controlled rescue system at a first location. Another step 706 comprises activating the remotely controlled rescue system. Another step 708 comprises attaching the first end of the cord to a portion of the remotely controlled rescue system. Another step 710 comprises attaching the second end of the cord to an object disposed at a second location. The second location is different from the first location. Another step 712 comprises remotely navigating the vehicle toward the person located at the rescue location using a first form of propulsion. Another step 714 comprises activating the personal floatation device of the remotely controlled rescue system. Another step 716 comprises communicating a request to the person that the person grasp a portion of the remotely controlled rescue system. Another step 718 comprises communicating a request to the person that the person grasp a portion of the personal floatation device. Another step 720 comprises remotely navigating the vehicle away from the person. Another step 722 comprises applying an axial force on the cord away from the person to remove the person from the rescue location (e.g., partially frozen body of water).

Figure 17A:
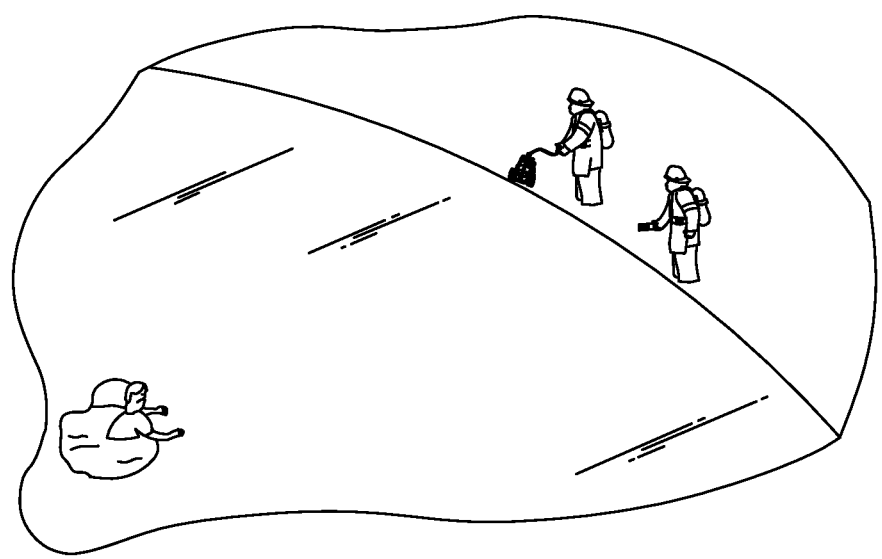
FIG. 17A illustrates a person disposed in a partially frozen body of water and two rescuers utilizing a remotely controlled rescue system to rescue the person. The remotely controlled rescue system is disposed adjacent the two rescuers.

Step 702 can be accomplished using any suitable remotely controlled rescue system, such as the embodiments described herein. Selection of a suitable remotely controlled rescue system can be based on various considerations, including the location of the person intended to be rescued. Examples of remotely controlled rescue systems considered suitable to complete a method of rescuing a person include remotely controlled rescue system 10, remotely controlled rescue system 310, remotely controlled rescue system 510, variations of the remotely controlled rescue systems described herein, and any other remotely controlled rescue system considered suitable for a particular embodiment. FIG. 17A illustrates a person 802 disposed in a partially frozen body of water 804 and two rescuers 806, 808 utilizing a remotely controlled rescue system 810 to rescue the person 802. The remotely controlled rescue system 810 includes a vehicle 812, a storage container 814, a cord 816, a personal floatation device 818, and a controller 820. In the method of rescuing a person 700, the remotely controlled rescue system 510 illustrated and described with respect to FIG. 15 has been illustrated as being used to rescue the person 802. However, alternative embodiments can comprise use of remotely controlled rescue system 10 illustrated and described with respect to FIGS. 1, 2, 3, 4, 5, 6, 7, 8, 9, 10, and 11, remotely controlled rescue system 310 illustrated and described with respect to FIGS. 12, 13, and 14, variations of the remotely controlled rescue systems described herein, and any other remotely controlled rescue system considered suitable for a particular embodiment.

While method 700 has been described as a method of rescuing a person at a rescue location disposed on a partially frozen body of water, the methods, the steps, the optional step, and/or the alternative steps described herein can be used to rescue a person located on, or within, any suitable location at which a remotely controlled rescue system can be navigated. Selection of a suitable location to utilize the methods, the steps, the optional step, and/or the alternative steps described herein to rescue a person can be based on various considerations, including the type and integrity of the terrain that surrounds the person intended to be rescued.

Examples of locations considered suitable to complete the methods, the steps, the optional step, and/or the alternative steps described herein include a body of water, a partially frozen body of water, open land, rough terrain, locations that include snow and/or ice, and any other location considered suitable for a particular embodiment.

Step 704 can be accomplished using any suitable technique or method of positioning the vehicle 812 of the remotely controlled rescue system 810 at a first location. For example, in embodiments in which the remotely controlled rescue system is disposed within, or attached to, a vehicle (e.g., fire truck, police car), step 704 can comprise removing the remotely controlled rescue system from the vehicle and positioning it at a first location (e.g., carrying the remotely controlled rescue system to the first location). Alternatively, in embodiments in which the remotely controlled rescue system is disposed on a surface, step 704 can be completed subsequent to step 706 and can comprise remotely navigating the remotely controlled rescue system to the first location.

Step 706 can be accomplished by activating the vehicle 812 and the controller 820 of the remotely controlled rescue system 810. The vehicle 812 is activated by applying a force on a switch (e.g., toggle switch) included on the vehicle that moves each receiver attached to the switch from an off state to an on state. The controller 820 is activated by applying a force on a switch included on the controller 820 such that it moves from an off state to an on state and is in communication with the receiver(s) included on the vehicle 812. Depending on the number of switches included on a vehicle, a vehicle can alternatively be activated by applying a force on each switch (e.g., toggle switch) included on the vehicle that moves each receiver attached to the switch from an off state to an on state. Optionally, step 706 can be omitted from method 700, for example, in instances in which the remotely controlled rescue system (e.g., vehicle, controller) are in standby mode or do not require activation.

Step 708 can be accomplished by attaching the first end of the cord 816 to any suitable portion of the vehicle 812 of the remotely controlled rescue system 810 using any suitable technique or method of attachment. Selection of a suitable portion of a remotely controlled rescue system to attach the first end of a cord and of a suitable technique or method of attachment to use between the cord and the remotely controlled rescue system can be based on various considerations, including the material that forms the cord. Examples of locations considered suitable to attach a first end of a cord to a portion of a remotely controlled rescue system include to a handle of a storage container, a portion of a storage container, a portion of a personal floatation device, a portion of a vehicle, a main body of a vehicle, and any other location considered suitable for a particular embodiment. Examples of techniques and methods of attaching a cord to a portion of a remotely controlled rescue system include tying a portion of the cord in a loop and attaching and end to a portion of the cord using adhesive or a knot, using adhesives, using other components, such as a carabiner, and any other technique or method of attachment considered suitable for a particular embodiment. In the illustrated method, the first end of the cord 816 is attached to the handle of a storage container by tying the cord in a knot around the handle. In alternative methods of rescuing a person, the first end of a cord can be pre-attached to a portion of a vehicle of a remotely controlled rescue system. In these embodiments, step 708 can be omitted from method 700. In alternative methods of rescuing a person, a cord can be attached to a personal floatation device such that if the personal floatation device becomes separated from a vehicle, the person being rescued can still be moved to a safe location using the cord.

Step 710 can be accomplished by attaching the second end of the cord 816 to any suitable object using any suitable technique or method of attachment. Selection of a suitable object to attach the second end of a cord and of a suitable technique or method of attachment to use between the cord and the object can be based on various considerations, including the material that forms the cord. Examples of objects considered suitable to attach a second end of a cord of a remotely controlled rescue system include a tree, a motor vehicle, a car, a truck, a fire truck, a SUV, a tractor, a tractor trailer, a boat, a person, a winch, objects selected from the group consisting of any of a tree, a motor vehicle, a car, a truck, a fire truck, a SUV, a tractor, a tractor trailer, a boat, a person, a winch, and any other object considered suitable for a particular embodiment. Examples of techniques and methods of attaching a cord to an object include tying a portion of the cord in a loop around the object and attaching and end to a portion of the cord using adhesive or a knot, using adhesives, using other components, such as a carabiner, and any other technique or method of attachment considered suitable for a particular embodiment. In the illustrated method, the second end of the cord 816 is attached to the second rescuer 808.

Figure 17B:
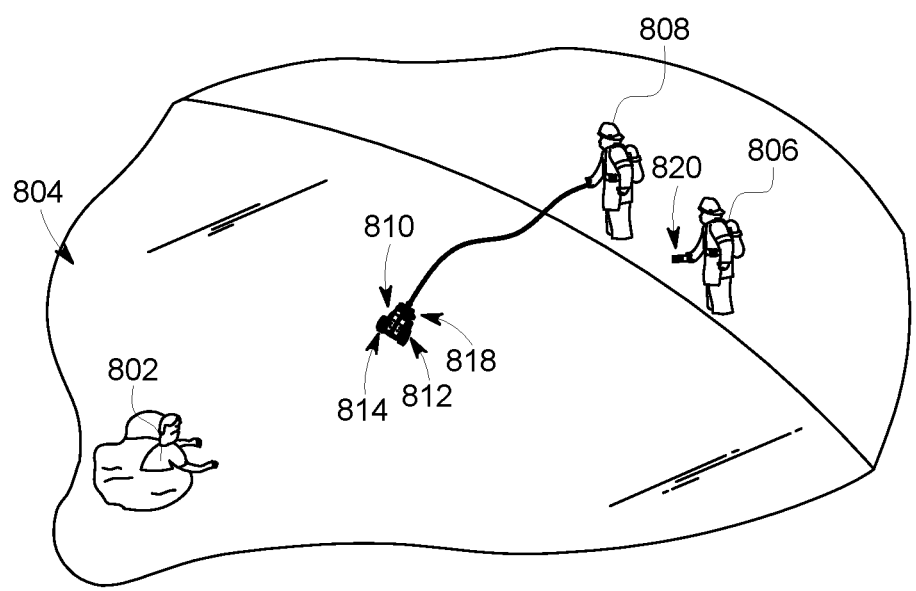
FIG. 17B illustrates a person disposed in a partially frozen body of water and two rescuers utilizing a remotely controlled rescue system to rescue the person. The vehicle of the remotely controlled rescue system is disposed on the partially frozen body of water.
Figure 17C:
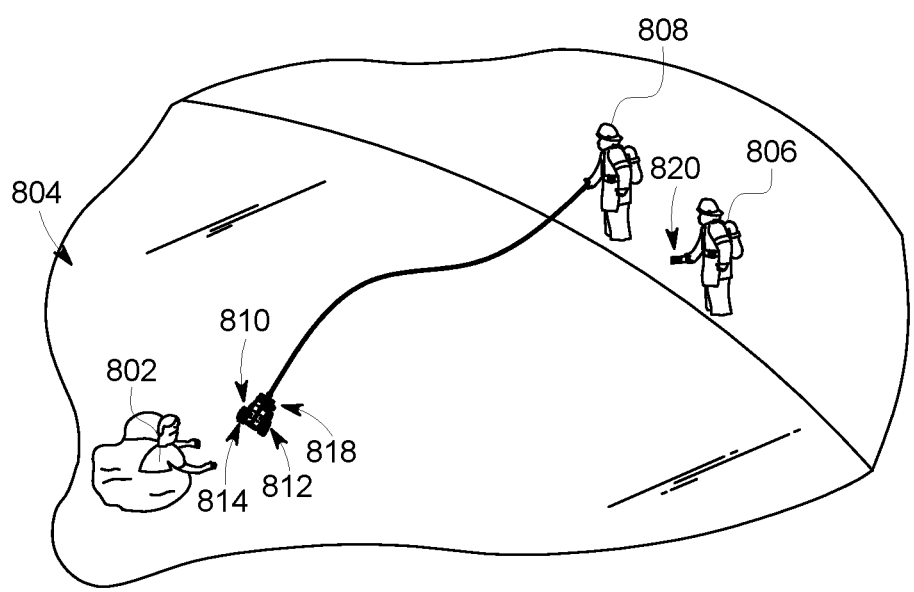
FIG. 17C illustrates a person disposed in a partially frozen body of water and two rescuers utilizing a remotely controlled rescue system to rescue the person. The vehicle of the remotely controlled rescue system is disposed adjacent to the person being rescued.

Step 712 can be accomplished using the controller 820 and by applying a force in any suitable direction on one or more of the user-manipulable control sticks and/or switches included on the controller 820 that control features of the vehicle 812. In the illustrated embodiment, the controller 820 is possessed by the first rescuer 806 such that step 712 is accomplished by the first rescuer 806 applying a force on one or more of the user-manipulable control sticks and/or switches in a direction that results in the desired navigation of the vehicle toward the person using the first motor and a first form of propulsion, as shown in FIG. 17B. In the illustrated embodiment, the first form of propulsion is ground propulsion and is accomplished by navigating the vehicle over a frozen portion of the partially frozen body of water 804. However, in alternative embodiment, the first form of propulsion can be any suitable form of propulsion, such as those described herein (e.g., marine propulsion).

An optional step that can be completed while step 712 is being completed, or prior to or subsequent to step 712 being completed, comprises adding a second cord to a first cord that is attached to a portion of the remotely controlled rescue system. This optional step can be accomplished by a rescuer (e.g., first rescuer 806, second rescuer 808, another person) attaching a second cord to the first cord using any suitable technique or method of attachment, such as those described herein. This optional step is considered advantageous at least because it provides a mechanism for navigating a vehicle to a person disposed at a rescue location that is disposed a distance from the first location that is greater than the length of the first rope. Subsequent to the competition of this optional step, step 712 can optionally be repeated.

Step 714 can be accomplished using the controller 820 and by applying a force in any suitable direction on one or more of the user-manipulable control sticks and/or switches included on the controller 820 that control the personal floatation device 818. In the illustrated embodiment, the controller 820 is possessed by the first rescuer 806 such that step 714 is accomplished by the first rescuer 806 applying a force on one or more of the user-manipulable control sticks and/or switches in a direction that results in the personal floatation device moving from the deflated configuration to the inflated configuration. Alternatively, step 714 can be accomplished by the person 802 disposed in the partially frozen body of water 804 by applying a force on the actuator of the personal floatation device 818 that is directed away from the inflatable vest such that the personal floatation device moves from the deflated configuration to the inflated configuration. Optionally, step 714 can be omitted from method 700, for example, in situations in which the person 802 is conscious and capable of grasping the cord, as described in step 716, or any other suitable portion of a remotely controlled rescue system.

Step 716 can be accomplished using any suitable form of communication and selection of a suitable form of communication can be based on various considerations, including the condition of the person being rescued. For example, step 716 can be accomplished by one of the rescuers 806, 808 phonating and requesting that the person 802 grasp the a portion of the remotely controlled rescue system (e.g., vehicle, storage container, cord, personal floatation device). Alternatively, in embodiments in which the remotely controlled rescue system includes a two-way radio, step 716 can be accomplished by communicating through the two-way radio. Optionally, step 716 can be omitted from method 700, for example, in scenarios in which the person 802 is conscious and grasps a portion of the remotely controlled rescue system (e.g., vehicle, storage container, cord, personal floatation device) without instruction.

Step 718 can be accomplished using any suitable form of communication and selection of a suitable form of communication can be based on various considerations, including the condition of the person being rescued. For example, step 718 can be accomplished by one of the rescuers 806, 808 phonating and requesting that the person 802 grasp a portion of the personal floatation device 818. Alternatively, in embodiments in which the remotely controlled rescue system includes a two-way radio, step 718 can be accomplished by communicating through the two-way radio. Optionally, step 718 can be omitted from method 700, for example, in scenarios in which the person 802 is conscious and grasps the personal floatation device without instruction.

An optional step comprises communicating with the person and requesting that the person grasp the vehicle of the remotely controlled rescue system in embodiments in which the vehicle itself is a floatation device. This optional step can be accomplished using any suitable form of communication and selection of a suitable form of communication can be based on various considerations, including the condition of the person being rescued. For example, this optional step can be accomplished by a rescuer phonating and requesting that a person grasp the vehicle. Alternatively, in embodiments in which the remotely controlled rescue system includes a two-way radio, this optional step can be accomplished by communicating through the two-way radio.

Step 720 can be accomplished using the controller 820 and by applying a force in any suitable direction on one or more of the user-manipulable control sticks and/or switches included on the controller 820 that control features of the vehicle 812. In the illustrated embodiment, the controller 820 is possessed by the first rescuer 806 such that step 720 is accomplished by the first rescuer 806 applying a force on one or more of the user-manipulable control sticks and/or switches in a direction that results in the desired navigation of the vehicle away from the person using the first motor and the first form of propulsion. In the illustrated embodiment, the first form of propulsion is ground propulsion and is accomplished by navigating the vehicle over the frozen portion of the partially frozen body of water 804. The direction in which the vehicle can be directed away from the person can include navigating the vehicle toward a rescuer (e.g., first rescuer 806, second rescuer 808) or toward another object, such as a vehicle, another person, another rescuer, the shore of the partially frozen body of water, and any other object considered suitable for a particular embodiment. Alternatively, step 720 can comprise remotely navigating the vehicle away from the person or remotely navigating the vehicle away from the person while the person has possession of a portion of the remotely controlled rescue system (e.g., cord, vehicle, storage container, personal floatation device).

Figure 17D:
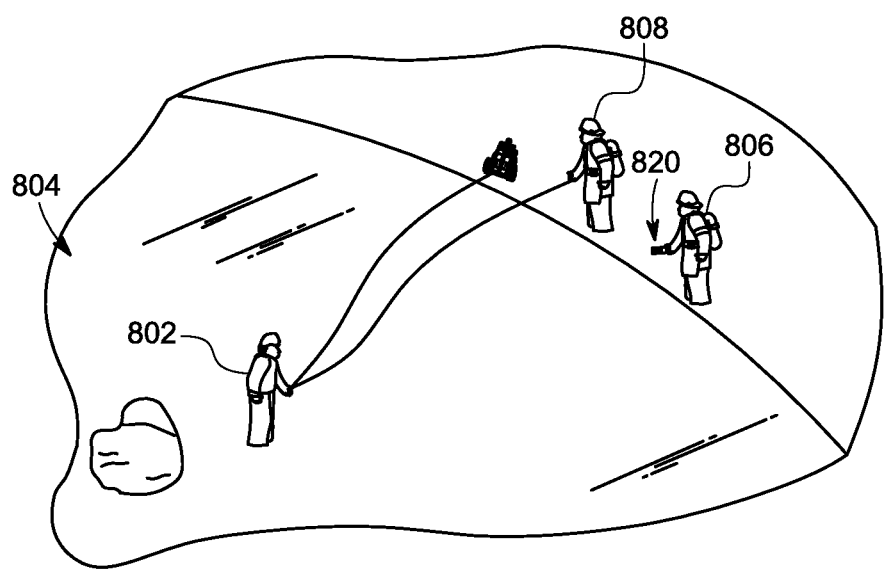
FIG. 17D illustrates a person disposed in a partially frozen body of water and two rescuers utilizing a remotely controlled rescue system to rescue the person. The vehicle of the remotely controlled rescue system is disposed adjacent the two rescuers and the person being rescued is disposed on the partially frozen body of water.

Step 722 can be accomplished by the second rescuer 808 grasping the cord and applying an axial force on the cord and away from the person 802 such that the person is removed from the rescue location and toward the second rescuer 808. Alternatively, in embodiments in which a remotely controlled rescue system is capable of pulling the person requiring rescuing from the rescue location, step 722 can be accomplished by the vehicle 812 applying an axial force on the cord and away from the person 802 such that the person is removed from the rescue location and toward another location (e.g., first location, toward a rescuer), as shown in FIG. 17D. This can be accomplished by applying a force in any suitable direction on one or more of the user-manipulable control sticks and/or switches included on a controller that control features of the vehicle. Alternatively, step 722 can be accomplished by any suitable person or object (e.g., winch) applying an axial force on the cord to remove the person from the rescue location.

An optional step comprises continuing the application of an axial force on the cord, as described in step 722 and can be accomplished by the second rescuer 808 continuing to apply an axial force on the cord and away from the person 802. Alternatively, in embodiments in which a remotely controlled rescue system is capable of pulling the person requiring rescuing from the rescue location, this optional step can be accomplished by the vehicle 812 applying an axial force on the cord and away from the person 802 such that the person is removed from the rescue location and toward another location (e.g., first location, toward a rescuer). This can be accomplished by applying a force in any suitable direction on one or more of the user-manipulable control sticks and/or switches included on a controller that control features of the vehicle. Alternatively, this optional step can be accomplished by any suitable person or object (e.g., winch) applying an axial force on the cord.

An optional step that can be completed after step 722 comprises deactivating the remotely controlled rescue system. This optional step can be accomplished by deactivating the vehicle and the controller of the remotely controlled rescue system. The vehicle is deactivated by applying a force on a switch (e.g., toggle switch) included on the vehicle that moves each receiver attached to the switch from an on state to an off state. The controller is deactivated by applying a force on a switch include on the controller such that it moves from an on state to an off state and is no longer in communication with the receiver(s) included on the vehicle. Depending on the number of switches included on a vehicle, a vehicle can alternatively be deactivated by applying a force on each switch (e.g., toggle switch) included on the vehicle that moves each receiver attached to the switch from an on state to an off state.

Method 700 is considered advantageous at least because it provides a method of rescuing a person that allows a rescuer to stay at a safe location that is not subject to a dangerous elements while providing the person with the necessary materials to bring them to the location at which the rescuer is located. In addition, method 700 allows the rescuer to call in for additional support should the situation require it while the rescuer is disposed at the location that is not subject to a dangerous elements.

While method 700 has been described with respect to rescuing a person disposed in a partially frozen body of water, any of the steps, alternative steps, and/or optional steps described herein can be utilized to rescue a person that is disposed in any location and can be included in method 900, as described herein.

Figure 18:
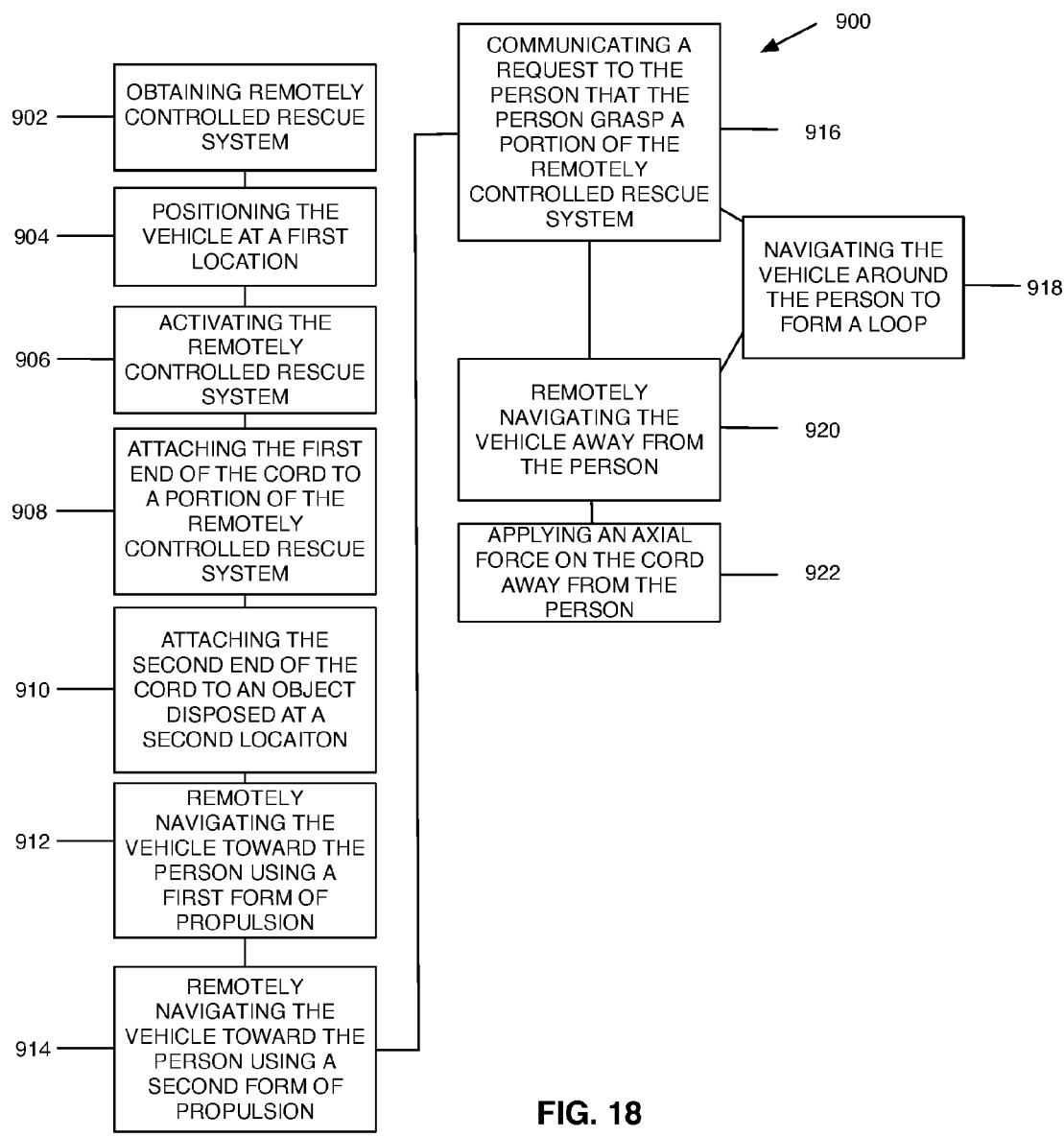
FIG. 18 is a schematic illustration of another example method of rescuing a person using a remotely controlled rescue system.

FIG. 18 is a schematic illustration of another method 900 of rescuing a person disposed at a rescue location. In the example described herein, the rescue location is a partially frozen lake.

An initial step 902 comprises obtaining a remotely controlled rescue system. The remotely controlled rescue system has a vehicle, a storage container attached to the vehicle, a cord disposed within the storage container, a personal floatation device attached to the vehicle, and a controller for remotely controlling the movement of the vehicle. The vehicle has a first motor that produces a first form of propulsion and a second motor that produces a second form of propulsion that is different from the first form of propulsion. The cord has a first end and a second end. Another step 904 comprises positioning the vehicle of the remotely controlled rescue system at a first location. Another step 906 comprises activating the remotely controlled rescue system. Another step 908 comprises attaching the first end of the cord to a portion of the remotely controlled rescue system. Another step 910 comprises attaching the second end of the cord to an object disposed at a second location. The second location is different from the first location. Another step 912 comprises remotely navigating the vehicle toward the person located at the rescue location using a first form of propulsion. Another step 914 comprises remotely navigating the vehicle toward the person located at the rescue location using a second form of propulsion. Another step 916 comprises communicating a request to the person that the person grasp a portion of the remotely controlled rescue system. If the person does not respond, another step 918 comprises remotely navigating the vehicle around the person to form a loop around the person using the cord. If the person does grasp a portion of the remotely controlled rescue system or step 918 has been completed, another step 920 comprises remotely navigating the vehicle away from the person while the person has possession of a portion of remotely controlled rescue system or the person is contained within the loop formed by the cord. Another step 922 comprises applying an axial force on the cord away from the person.

Step 902 is accomplished as described with respect to step 702. Step 904 is accomplished as described with respect to step 704. Step 906 is accomplished as described with respect to step 706. Step 908 is accomplished as described with respect to step 708. Step 910 is accomplished as described with respect to step 710. Step 912 is accomplished as described with respect to step 712.

An optional step that can be completed prior to step 914 comprises remotely navigating the vehicle toward a person such that the vehicle moves from being disposed on a first material (e.g., ice, snow) to being disposed on a second material (e.g., water). This optional step can be accomplished by using the controller and by applying a force in any suitable direction on one or more of the user-manipulable control sticks and/or switches included on the controller that control features of the vehicle. In the illustrated embodiment, the controller is possessed by the first rescuer such that this optional step is accomplished by the first rescuer applying a force on one or more of the user-manipulable control sticks and/or switches in a direction that results in the desired navigation of the vehicle toward the person using the first motor and the first form of propulsion and the second motor and the second form of propulsion.

Step 914 can be accomplished using the controller and by applying a force in any suitable direction on one or more of the user-manipulable control sticks and/or switches included on the controller that control features of the vehicle. In the illustrated embodiment, the controller is possessed by the first rescuer such that step 914 is accomplished by the first rescuer applying a force on one or more of the user-manipulable control sticks and/or switches in a direction that results in the desired navigation of the vehicle toward the person using the second motor and a second form of propulsion. In the illustrated embodiment, the second form of propulsion is marine propulsion and is accomplished by navigating the vehicle in the water of the partially frozen body of water.

Step 916 is accomplished as described with respect to step 716.

Step 918 can be accomplished using the controller and by applying a force in any suitable direction on one or more of the user-manipulable control sticks and/or switches included on the controller that control features of the vehicle. In the illustrated embodiment, the controller is possessed by the first rescuer such that step is accomplished by the first rescuer applying a force on one or more of the user-manipulable control sticks and/or switches in a direction that results in the desired navigation of the vehicle toward the person using the second motor and the second form of propulsion. This step is considered advantageous in situations in which the person is unconscious and/or is unable to grasp the cord.

Step 920 is accomplished as described with respect to step 720. Alternatively, step 918 and 920 can comprise a single step that comprises remotely navigating the vehicle around the person to form a loop around the person and can be accomplished as described with respect to step 918. Step 922 is accomplished as described with respect to step 722.

An optional step that can be completed prior to step 920 comprises remotely navigating the vehicle away from the person such that the vehicle moves from being disposed on a second material (e.g., water) to being disposed on a first material (e.g., ice, snow). This optional step can be accomplished by using the controller and by applying a force in any suitable direction on one or more of the user-manipulable control sticks and/or switches included on the controller that control features of the vehicle. In the illustrated embodiment, the controller is possessed by the first rescuer such that this optional step is accomplished by the first rescuer applying a force on one or more of the user-manipulable control sticks and/or switches in a direction that results in the desired navigation of the vehicle away from the person using the first motor and the first form of propulsion and/or the second motor and the second form of propulsion.

While methods 700 and 900 have been described as being accomplished using remotely controlled rescue system that includes a vehicle with a first motor that produces a first form of propulsion and a second motor that includes a second form of propulsion, each of methods 700 and 900 can be accomplished using a remotely controlled rescue system that includes only a first motor that produces a first form of propulsion. In this alternative method of rescuing a person, step 914 can be omitted.

Figure 19:
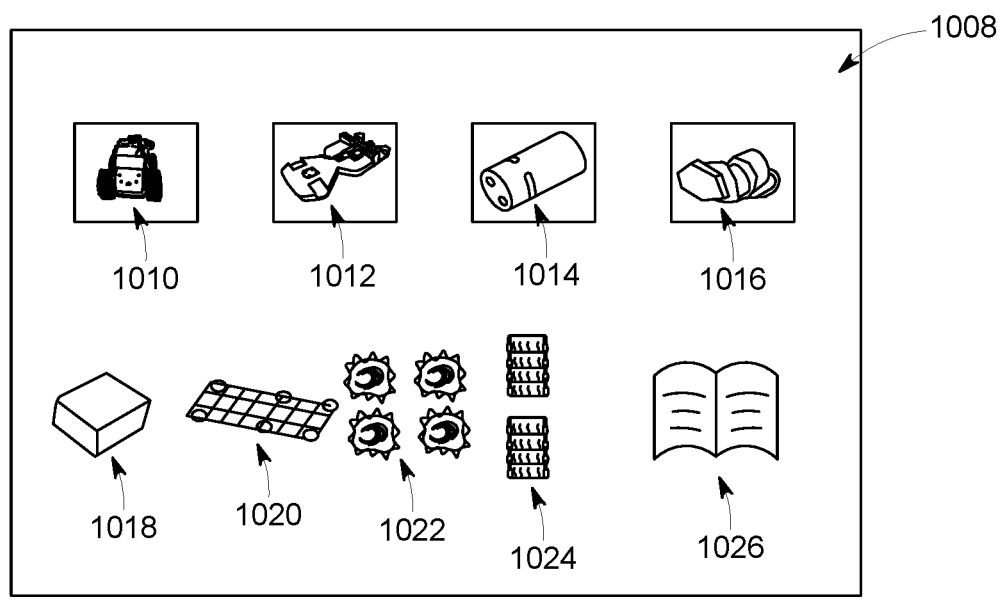
FIG. 19 illustrates an example kit that includes a remotely controlled rescue system.

FIG. 19 illustrates an exemplary kit 1008 that includes a remotely controlled rescue system 1010. In the illustrated embodiment, the kit 1008 includes a first remotely controlled rescue system 1010 according to an embodiment, such as remotely controlled rescue system 10 illustrated in FIGS. 1, 2, 3, 4, 5, 6, 7, 8, 9, 10, and 11; a bottom plate 1012 according to an embodiment, such as bottom plate 430 illustrated in FIGS. 13 and 14; a second motor 1014 according to an embodiment, such as second motor 432 illustrated in FIG. 13; a nozzle 1016 according to an embodiment, such as nozzle 434 illustrated in FIG. 13; a marine servo 1018 according to an embodiment, such as marine servo 436 illustrated in FIG. 13; a grate 1020 according to an embodiment, such as grate 438 illustrated in FIG. 14; a plurality of tires 1022 according to an embodiment, such as the plurality of tires 44 illustrated in FIG. 4; a set of snow chains 1024 according to an embodiment, such as those illustrated in FIG. 1; and instructions for use 1022.

While kit 1008 has been illustrated as including a first remotely controlled rescue system 1010, any suitable number, and type, of remotely controlled rescue systems, and other components, devices, systems, features, can be included in a kit. Selection of a suitable number of remotely controlled rescue systems, components, devices, systems, and/or features to include in a kit according to a particular embodiment can be based on various considerations, such as the intended use of the kit. Examples of suitable numbers of remotely controlled rescue systems, components, devices, systems, and/or features to include in a kit include at least one, one, two, a plurality, three, four and any other number considered suitable for a particular embodiment. Examples of other components, devices, systems, and/or features to include in a kit include additional energy storage devices, such as those described herein, a thermal blanket, and any other component, device, system, and/or feature considered suitable for a particular embodiment.

Furthermore, while remotely controlled rescue system 10 has been illustrated as included in kit 1008, any suitable remotely controlled rescue system can be included in a kit. Selection of a suitable remotely controlled rescue system to include in a kit according to a particular embodiment can be based on various considerations, such as the intended use of the kit. Examples of remotely controlled rescue systems considered suitable to include in a kit include remotely controlled rescue system 10, remotely controlled rescue system 310, remotely controlled rescue system 510, variations of the remotely controlled rescue systems described herein, any of the components of a remotely controlled rescue system, and/or any other remotely controlled rescue system considered suitable for a particular embodiment.

Those with ordinary skill in the art will appreciate that various modifications and alternatives for the described and illustrated embodiments can be developed in light of the overall teachings of the disclosure. Accordingly, the particular arrangements disclosed are intended to be illustrative only and not limiting as to the scope of the invention, which is to be given the full breadth of the appended claims and any and all equivalents thereof.

What is claimed is:

1. A method of rescuing a person disposed at a rescue location, the method comprising the steps of:
    obtaining a remotely controlled rescue system having a vehicle, a storage container attached to the vehicle, a cord disposed within the storage container, and a controller for remotely controlling movement of the vehicle, the vehicle having a first motor that produces a first form of propulsion and a second motor that produces a second form of propulsion that is different from the first form of propulsion, the cord having a first end and a second end;
    positioning the vehicle of the remotely controlled rescue system at a first location;
    attaching the second end of the cord to an object disposed at a second location that is different from the first location;
    remotely navigating the vehicle toward said person at said rescue location;
    communicating a request to said person that said person grasp a portion of the remotely controlled rescue system;
    remotely navigating the vehicle away from said person; and
    applying an axial force on the cord and away from said person to remove said person from said rescue location.

2. The method of claim 1, wherein the remotely controlled rescue system has a personal floatation device attached to the vehicle;
    further comprising the step of activating the personal floatation device; and
    wherein the step of communicating a request to said person that said person grasp a portion of the remotely controlled rescue system comprises communicating a request to said person that said person grasp the personal floatation device.

3. The method of claim 1, wherein the step of applying an axial force on the cord and away from said person to remove said person from said rescue location comprises grasping the cord and applying an axial force on the cord and away from said person to remove said person from said rescue location.

4. The method of claim 1, wherein the step of remotely navigating the vehicle away from said person comprises remotely navigating the vehicle around said person to form a loop around said person.

5. The method of claim 1, wherein the first motor comprises an electric motor; and
    wherein the second motor comprises a jet drive.

6. The method of claim 1, wherein the first form of propulsion is ground propulsion; and
    wherein the second form of propulsion is marine propulsion.

7. The method of claim 1, wherein the remotely controlled rescue system has a support frame and a main body attached to the support frame, the main body formed of a material that is buoyant in water.

8. The method of claim 1, wherein the remotely controlled rescue system has a support frame and a bottom plate, each of the first motor and the bottom plate attached to the support frame, the bottom plate formed of a material that is buoyant in water; and
    wherein the second motor is attached to the bottom plate.

9. The method of claim 1, further comprising the step of attaching the first end of the cord to a portion of the remotely controlled rescue system.

10. The method of claim 9, wherein the step of attaching the first end of the cord to a portion of the remotely controlled rescue system comprises attaching the first end of the cord to the storage container.

11. The method of claim 1, wherein the step of attaching the second end of the cord to an object disposed at a second location that is different from the first location comprises attaching the second end of the cord to a second vehicle selected from the group consisting of a car, a truck, a van, a SUV, a fire truck, and an ambulance.

12. The method of claim 1, wherein the step of remotely navigating the vehicle away from said person comprises remotely navigating the vehicle away from said person and toward the first location.

13. A method of rescuing a person disposed at a rescue location, the method comprising the steps of:
- obtaining a remotely controlled rescue system having a vehicle, a storage container attached to the vehicle, a cord disposed within the storage container, and a controller for remotely controlling movement of the vehicle, the vehicle having a support frame, a bottom plate attached to the support frame, a first motor attached to the support frame that produces ground propulsion, and a second motor attached to the bottom plate that produces marine propulsion, the cord having a first end and a second end, the bottom plate formed of a material that is buoyant in water and defining a recess, the second motor disposed within the recess defined by the bottom plate;
- positioning the vehicle of the remotely controlled rescue system at a first location;
- attaching the second end of the cord to an object disposed at a second location that is different from the first location;
- remotely navigating the vehicle toward said person at said rescue location;
- communicating a request to said person that said person grasp a portion of the remotely controlled rescue system;
- remotely navigating the vehicle around said person to form a loop around said person; and
- applying an axial force on the cord and away from said person to remove said person from said rescue location.

14. The method of claim 13, wherein the remotely controlled rescue system has a personal floatation device attached to the vehicle;
- further comprising the step of activating the personal floatation device; and
- wherein the step of communicating a request to said person that said person grasp a portion of the remotely controlled rescue system comprises communicating a request to said person that said person grasp the personal floatation device.

15. The method of claim 13, wherein the step of applying an axial force on the cord and away from said person to remove said person from said rescue location comprises grasping the cord and applying an axial force on the cord and away from said person to remove said person from said rescue location.

16. The method of claim 13, wherein the first motor comprises an electric motor; and
- wherein the second motor comprises a jet drive.

17. The method of claim 13, wherein the remotely controlled rescue system has a main body attached to the support frame, the main body formed of a material that is buoyant in water.

18. The method of claim 13, further comprising the step of attaching the first end of the cord to the storage container.

19. The method of claim 13, wherein the step of attaching the second end of the cord to an object disposed at a second location that is different from the first location comprises attaching the second end of the cord to a second vehicle selected from the group consisting of a car, a truck, a van, a SUV, a fire truck, and an ambulance.

20. A method of rescuing a person disposed at a rescue location, the method comprising the steps of:
- obtaining a remotely controlled rescue system having a vehicle, a storage container attached to the vehicle, a cord disposed within the storage container, a personal floatation device attached to the vehicle, and a controller for remotely controlling movement of the vehicle, the vehicle having a support frame, a main body attached to the support frame, a bottom plate attached to the support frame, a first motor attached to the support frame that produces ground propulsion, and a second motor attached to the bottom plate that produces marine propulsion, the support frame having a first deck, a second deck, and a spacer disposed between the first deck and the second deck, the spacer attached to each of the first deck and the second deck, each of the storage container and the personal floatation device attached to the main body, the cord having a first end and a second end, each of the main body and bottom plate formed of a material that is buoyant in water, the bottom plate defining a recess, the second motor disposed within the recess defined by the bottom plate;
- positioning the vehicle of the remotely controlled rescue system at a first location;
- attaching the first end of the cord to a portion of the remotely controlled rescue system;
- attaching the second end of the cord to an object disposed at a second location that is different from the first location;
- remotely navigating the vehicle toward said person at said rescue location;
- activating the personal floatation device;
- communicating a request to said person that said person grasp the personal floatation device;
- remotely navigating the vehicle around said person to form a loop around said person; and
- applying an axial force on the cord and away from said person to remove said person from said rescue location.

* * * * *